(12) United States Patent
Domke et al.

(10) Patent No.: US 9,916,452 B2
(45) Date of Patent: Mar. 13, 2018

(54) SELF-CONTAINED CRYPTOGRAPHIC BOOT POLICY VALIDATION

(71) Applicant: Microsoft Technology Licensing, LLC, Redmond, WA (US)

(72) Inventors: Felix Domke, Hamburg (DE); Ling Tony Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 15/158,401

(22) Filed: May 18, 2016

(65) Prior Publication Data
US 2017/0337380 A1 Nov. 23, 2017

(51) Int. Cl.
G06F 9/00 (2006.01)
G06F 15/177 (2006.01)
G06F 21/57 (2013.01)
H04L 9/08 (2006.01)
G06F 9/44 (2018.01)
(Continued)

(52) U.S. Cl.
CPC ............ *G06F 21/572* (2013.01); *G06F 9/442* (2013.01); *G06F 9/4406* (2013.01); *H04L 9/0869* (2013.01); *H04L 9/3242* (2013.01); *H04L 9/3247* (2013.01); *G06F 21/57* (2013.01); *G06F 21/575* (2013.01); *G06F 2221/031* (2013.01); *H04L 9/0861* (2013.01); *H04L 9/14* (2013.01); *H04L 2209/127* (2013.01)

(58) Field of Classification Search
CPC ....... H04L 9/14; H04L 9/3247; H04L 9/0861; H04L 2209/127; G06F 21/575; G06F 21/57
See application file for complete search history.

(56) References Cited

U.S. PATENT DOCUMENTS 5,421,006 A 5/1995 Jablon et al.
6,209,099 B1 3/2001 Saunders
(Continued)

FOREIGN PATENT DOCUMENTS

CN 104123505 A 10/2014

OTHER PUBLICATIONS

Lohr, et al., "Patterns for Secure Boot and Secure Storage in Computer Systems", In International Conference on Availability, Reliability, and Security, Feb. 15, 2010, pp. 569-573.
(Continued)

*Primary Examiner* — Xuxing Chen
(74) *Attorney, Agent, or Firm* — Arent Fox LLP

(57) ABSTRACT

A device-local key derivation scheme generates, during a first boot session for an electronic device, a sealing key that is derived at least in part from a device-generated random seed and an internal secret that is unique to the electronic device. After generating the sealing key, access to the internal secret is disabled for a remainder of the first boot session and until a second boot session is initiated. At runtime, the sealing key is used to sign a module manifest that describes the software that is authorized to access the sealing key, and the module manifest containing the sealing key is persisted in non-volatile memory of the electronic device. The module manifest can be used to validate software during a subsequent boot session and to authorize software updates on the electronic device without relying on an external entity or external information to protect on-device secrets.

20 Claims, 11 Drawing Sheets

(51) Int. Cl.
*H04L 9/32* (2006.01)
*H04L 9/14* (2006.01)

(56) References Cited

U.S. PATENT DOCUMENTS

| | | | |
|---|---|---|---|
| 6,370,649 B1 | 4/2002 | Angelo et al. | |
| 6,907,522 B2 | 6/2005 | Morais et al. | |
| 6,986,059 B2 | 1/2006 | England et al. | |
| 7,120,249 B2 * | 10/2006 | Roberts | H04L 9/0869 380/278 |
| 7,174,457 B1 | 2/2007 | England et al. | |
| 7,343,493 B2 | 3/2008 | Challener et al. | |
| 7,984,286 B2 | 7/2011 | Zimmer et al. | |
| 8,060,732 B2 | 11/2011 | Jones et al. | |
| 8,254,568 B2 | 8/2012 | Smith et al. | |
| 8,528,108 B2 * | 9/2013 | Ammer | G06F 21/78 713/2 |
| 8,566,574 B2 | 10/2013 | Shriver | |
| 9,058,504 B1 | 6/2015 | Swanson et al. | |
| 2003/0105968 A1 | 6/2003 | Cheston et al. | |
| 2007/0098149 A1 * | 5/2007 | Coenen | G06F 21/123 713/2 |
| 2009/0193211 A1 * | 7/2009 | Hu | G06F 21/575 711/163 |
| 2012/0151199 A1 | 6/2012 | Shriver | |
| 2012/0265998 A1 | 10/2012 | Kumar et al. | |
| 2016/0048684 A1 | 2/2016 | Kocher et al. | |

OTHER PUBLICATIONS

"International Search Report and Written Opinion Issued in PCT Application No. PCT/US2017/032305", dated Jul. 4, 2017, 12 Pages.

* cited by examiner

SELF-CONTAINED CRYPTOGRAPHIC BOOT POLICY VALIDATION

BACKGROUND

Electronic devices are often used to store private user data in digital form. This data can be protected in various ways. For example, an operating system (OS) installed on an electronic device can require authentication procedures to be performed prior to accessing the data (e.g., requiring a user to enter a passphrase before the user can access the data stored on the electronic device). Hard drive encryption software can also be used to encrypt on-device data so that an attacker cannot gain access to the data by simply removing the hard drive and plugging the hard drive into a different machine. The security of data on the electronic device is therefore premised on keeping information secret (e.g., passphrases, cryptographic keys, etc.) so that an attacker cannot discover the secrets and gain access to the sensitive data stored on the electronic device.

Furthermore, when the current OS version on the electronic device needs to be updated (e.g., replaced with an updated OS version), the system software of the electronic device can verify that the updated code was signed with a private signing key that is only known to, and possessed by, a trusted entity (e.g., the manufacturer of the electronic device and/or the OS software). In this manner, the electronic device implicitly trusts all code that is signed by the trusted entity using the private signing key. Notwithstanding the aforementioned security measures, unauthorized entities (or attackers) have still found ways to circumvent these security measures in order to gain access to device secrets.

For example, an attacker can exploit the fact that a particular manufacturer signs a large number of software releases, which increases the probability of one or more of the releases containing a software bug. It only takes one signed software release that contains a bug for the attacker to exploit the bug in order to circumvent a security measure of the electronic device, such as the aforementioned passphrase check. Once the attacker discovers a signed software release containing such a bug, this signed code can be installed on the electronic device (because the code was signed with the private signing key), and the bug in the installed software can be exploited for the purpose of circumventing security measures on the electronic device, thereby allowing the attacker to gain access to device secrets and private on-device data.

Existing approaches that attempt to solve the aforementioned security flaw all suffer from a similar drawback; namely, that the electronic device is reliant on entities and/or information that is external to the electronic device itself to keep on-device secrets secure while allowing updates to the device software. For example, a "whitelist" approach can be used to validate software releases against a list of previously validated code, but this requires a way to keep the whitelist up-to-date and is reliant on an external mechanism to do so. A "blacklist" approach can also be used to define a revocation list of "known-bad software" that is referenced before updating the device software, but the attacker in this scenario can simply restrict communication to the electronic device and prevent the device from updating the blacklist, allowing malicious software to be installed on the device. Signature verification suffers from a similar drawback in that an outside entity in possession of a secret key is required to define which software is to be trusted by the electronic device. This not only requires an infrastructure to manage and sign software updates, but it is also a security flaw because it creates a high-value secret outside of the device, which, when obtained, allows an attacker to access on-device secrets for an entire class of devices.

SUMMARY

Described herein are techniques and systems for implementing a self-contained cryptographic boot policy validation on an electronic device. The techniques and systems described herein are "self-contained" in the sense that they do not rely on an external entity or external information to protect on-device secrets while supporting secure software upgrades on the electronic device.

A device-local key derivation scheme can be utilized to allow current software running on the electronic device to create and keep on-device secrets instead of relying on an external source to create and maintain a private key used for signing authorized software. This device-local key derivation scheme generates, during an initial (first) boot session for the electronic device, a device-local private key (referred to herein as a "sealing key"). This sealing key is derived in part from a random seed generated using a random number generator of the electronic device and in part from an internal secret (i.e., internal to the electronic device) that is unique to the electronic device. After the sealing key is generated, access to the internal secret is disabled for a remainder of the first boot session and until a second boot session is initiated. In other words, access to the internal secret is made unavailable after the sealing key is generated and until the electronic device resets or reboots. Code measurements of the current software running on the electronic device can also be calculated during the initial (first) boot. The code measurements can comprise a list of hashes of boot stages for the first boot session.

At runtime of the electronic device, data (e.g., user data) can be encrypted using the sealing key, and the encrypted data can be stored in non-volatile memory of the electronic device. For example, a randomized application-specific key used for hard drive encryption can be generated, and the sealing key can be used to encrypt (or wrap) the randomized application-specific key. Furthermore, the sealing key can be used to sign a data structure that describes the software (or the current state of the software) that is authorized to access the sealing key. For instance, a signature can be generated based in part on the sealing key and in part on the code measurements calculated during the first boot session. This signature can be used to sign at least a portion of the data structure, and the signed data structure (sometimes referred to herein as a "module manifest") can be persisted in the non-volatile memory of the electronic device. The module manifest persisted on the electronic device contains the code measurements (e.g., the hashes of the boot stages for the first boot session), the random seed, and the signature derived from the sealing key. The sealing key can also be maintained in a private portion of the module manifest so that the current software stack executing on the electronic device has exclusive access to the sealing key.

During any subsequent boot session (e.g., a second boot session) of the electronic device, the module manifest that was previously persisted in non-volatile memory is loaded and validated before the second boot session completes. For instance, the sealing key can be re-derived in part from the random seed maintained in the module manifest and in part from the internal secret that is again made accessible after the reboot of the electronic device. This produces the same sealing key as the sealing key generated during the initial (first) boot. A signature can be re-derived from this re-derived sealing key, and checked against the signature in the module manifest. If the compared signatures do not match, the sealing key is securely erased from the electronic device along with the module manifest as a security measure to prevent modified code and/or attackers from accessing the sealing key. Upon a match of the compared signatures, the bootloader of the electronic device, as well as the individual boot stages of a boot session, can collectively determine whether the module manifest describes the software that the device is actually booting (e.g., by verifying that the boot stages of the boot session match the set of signed boot stages in the module manifest). If the module manifest does not describe the software that the device is actually booting, the sealing key is securely erased from the electronic device along with the module manifest. If, on the other hand, the bootloader and the individual boot stages determine that the module manifest describes the software that the device is actually booting, the module manifest is validated, the device completes the boot session, and the sealing key is retained in the module manifest for access by the software running on the electronic device.

When the current software stack on the electronic device is to be updated with new software, the current software stack that has access to the device-local sealing key has exclusive use of the sealing key (i.e., no other software can use the sealing key) to self-sign, and persist in non-volatile memory, a new module manifest that describes the new software (e.g., a list of hashes that corresponds to the new software) that is to have access to the sealing key. In this manner, the current software that has access to the sealing key has exclusive ownership over the determination of which other software (e.g., a software upgrade) should have access to the sealing key, and the current software is therefore able to forward the trust to a new version of software so that the new software can access the sealing key. With the techniques and systems described herein, an attacker cannot install an unauthorized software update without destroying the sealing key because any changes in the boot code invalidate the verification and render the sealing key inaccessible, and there is no way for the attacker to convince the current software that the updated software is safe to install. Moreover, any external secret that has been obtained by an attacker cannot cause the sealing key to be disclosed to untrusted software. Meanwhile, the techniques and systems described herein allow for the installation of software updates that are authorized by the current software on the electronic device. In this manner, the electronic device can be updated with authorized installations.

With the techniques and systems described herein, no entity that is external to the electronic device is trusted with any information that can be used to surrender the on-device secrets. Instead, self-signing is used to initially bootstrap a secure software context, and after the current software on the electronic device has been trusted with secrets, the current software stack itself—as opposed to an external party—has exclusive control over the decision of which other (e.g., future) software can access these secrets. This creates a self-contained security feature with respect to the electronic device that does not rely on an outside infrastructure. It also ties the data encryption closer to the actual code running on the electronic device and allows the current software stack on the electronic device to perform one or more optional verification operations before allowing an update to the device software.

Also described herein are attestation procedures that allow a remote server to verify that the electronic device has actually booted a version of software that the electronic device tells the remote server it has booted. In this manner, the electronic device is unable to "fool" a remote server by booting malicious software and telling the remote server that it booted different software that is not malicious.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Configurations of the present disclosure are directed to, among other things, techniques and systems for implementing a self-contained cryptographic boot policy validation on an electronic device. The self-contained cryptographic boot policy validation, when implemented on an electronic device, creates an electronic device that is more secure than existing electronic devices. This is due at least partly to a device-local key derivation scheme and corresponding boot policy validation that is not reliant on entities and/or information external to the electronic device. Thus, the device-local key derivation scheme and boot policy validation is self-contained with respect to the electronic device. In this manner, a manufacturer of the electronic device implementing the techniques and systems described herein could not be compelled to access secrets stored on the electronic device due to the fact that the manufacture, let alone any entity, is unable to circumvent the self-contained security features of the electronic device. This issue recently became highly publicized in the dispute between Apple® Inc. and the Federal Bureau of Investigation (FBI) over whether, and to what extent, the courts can compel manufacturers to assist federal government agencies in "unlocking" consumer electronic devices containing on-device secrets. With the self-contained cryptographic boot policy validation scheme described herein, a manufacturer of an electronic device could avoid such a dispute altogether because the manufacturer does not have the capability of "unlocking" the electronic device.

Figure 1:
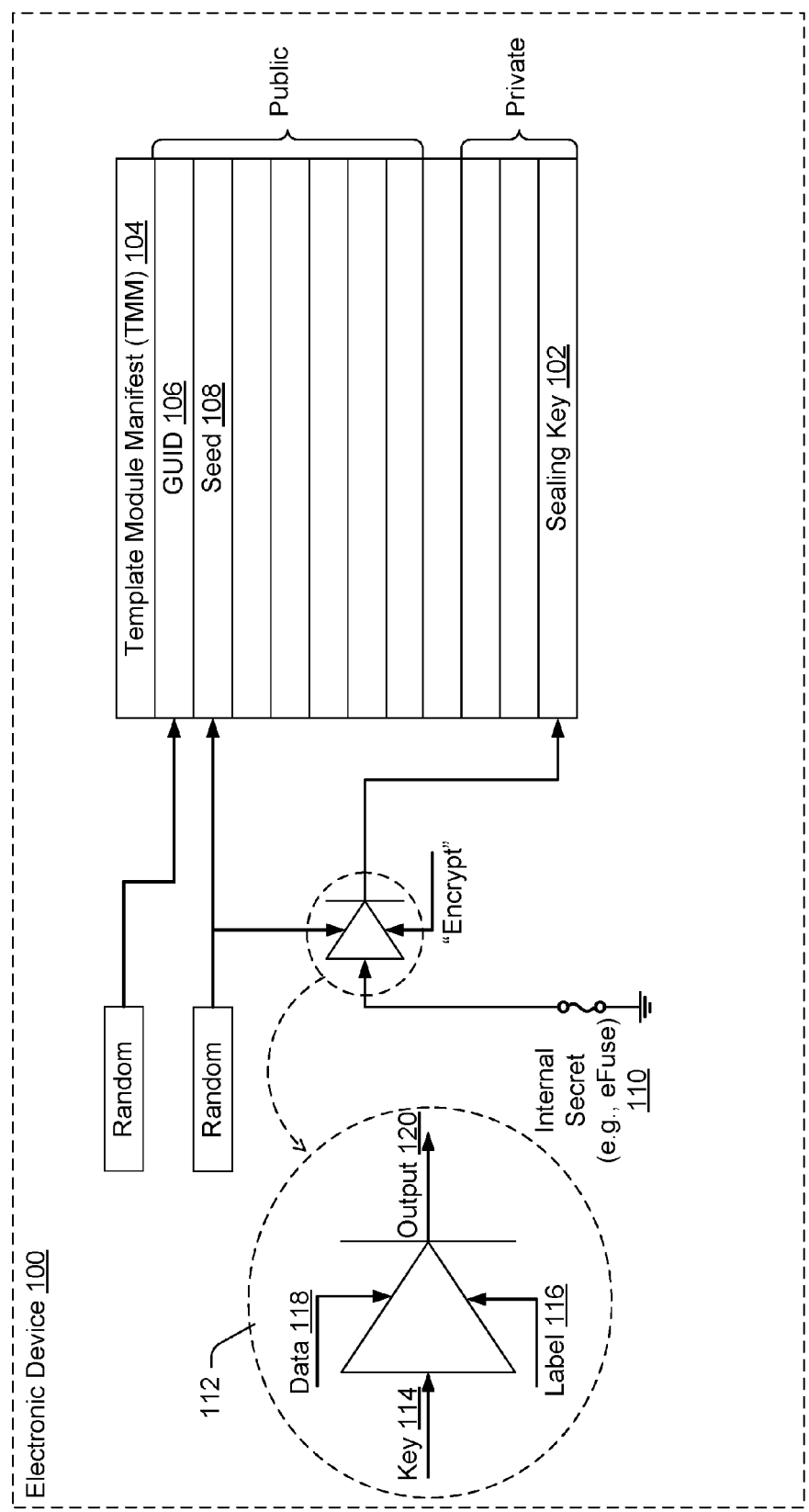
FIG. 1 is a schematic diagram showing an example device-local key derivation scheme.

FIG. 1 is a schematic diagram showing an example device-local key derivation scheme to be implemented on an electronic device 100. The device-local key derivation scheme starts from the notion of a "blank" electronic device 100. For example, a user may buy a new electronic device 100 (e.g., a laptop computer, tablet, smart phone, etc.). An operating system (OS) may not be pre-installed on the electronic device 100. In this scenario, the user is tasked with downloading, or installing from removable storage media, an OS onto the electronic device 100. Prior to installing an OS on the electronic device 100, a bootstrapping process can be used to allow an initial set of software on the electronic device 100 to create a random, device-local private key (referred to herein as a "sealing key 102"). This bootstrapping process is illustrated in the diagram of FIG. 1.

The sealing key 102 is a "device-local" key because it is derived locally by the electronic device 100. The sealing key 102 can comprise a symmetric cryptographic key that is used for encrypting and decrypting data stored on the electronic device 100. The sealing key 102 can be used for multiple versions of software (e.g., a first version of an OS, a second version of an OS, and so on), as opposed to a cryptographic key that is strictly dependent on the software version.

When the electronic device 100 initially boots for a first time (i.e., a first boot session), a template data structure (referred to herein as a "template module manifest (TMM) 104") is generated. The TMM 104 comprises a data structure having a plurality of initially-empty fields that can be populated with data. FIG. 1 shows that the sealing key 102 can be written to a field of the TMM 104 that is in a private portion of the TMM 104. Keeping the sealing key 102 stored in a secure, private manner means that external and/or modified software is prevented from accessing the sealing key 102, or any private portion of the TMM 104 for that matter. FIG. 1 also shows a globally unique identifier (GUID) 106 and a random seed 108 that can be written to respective fields of the TMM 104, such as fields that are in a public portion of the TMM 104. Data written to the public portion of the TMM 104 is generally accessible to any processes and software on the electronic device 100. The GUID 106 can be generated from a random (or pseudo-random) number, such as by a random number generator (RNG) of the electronic device 100, and the GUID 106 can be used to uniquely identify the TMM 104 and distinguish it from other TMMs 104 that can be created on the electronic device 100.

The random seed 108 can also be generated during the first boot session as part of the device-local key derivation scheme that ultimately produces the sealing key 102. In some configurations, the random seed 108 is generated using a RNG of the electronic device 100. The random seed 108 is statistically unlikely to ever be the same if the electronic device 100 is booted multiple times because the random seed 108 can be a sufficiently large number (e.g., a 128 bit number, a 256 bit number, or the like).

The sealing key 102 can be derived in part from the random seed 108 and in part from an internal secret 110 (sometimes referred to herein as an "electronic fuse (eFuse) secret 110") using a cryptographic primitive (e.g., a hash-based message authentication code (HMAC) algorithm). The internal secret 110 comprises a secret that is internal to the electronic device 100 and unique to the electronic device 100. An eFuse device, or similar hardware chip, can be utilized for this purpose. Accordingly, the internal secret 110 can comprise a hardware-based key, such as an eFuse secret 110 that is "burned" into the chip at the time of manufacturing the chip. The electronic device 100 can be associated with a corresponding, internal secret 110 at the time of manufacturing the electronic device 100 that is unique to the electronic device 100, and, in some configurations, the internal secret 110 can be known exclusively to the electronic device 100.

The cryptographic primitive that generates the sealing key 102—in part from the random seed 108 and in part from the internal secret 110—can be implemented in hardware, software, or a combination thereof. In an illustrative example, an HMAC algorithm is used to generate the sealing key 102, and a generalization of this key derivation function (KDF) is shown by the "diode visualization 112" in FIG. 1. In the diode visualization 112, a key 114, a label 116, and data 118 are taken as input by a cryptographic primitive to generate an output 120 (i.e., output 120=HMAC(key 114, label 116|data 118)). In general, the key 114 can be kept secret, while the label 116 and the data 118 may not be secret (i.e., the label 116 and the data 118 can be publicly available to other processes and software). In some configurations, the label 116 can be concatenated with the data 118 in the HMAC algorithm The nature of the KDF shown in the diode visualization 112 means that observing the output 120, the label 116, and the data 118 provides an attacker no way of reversing the KDF to derive the secret key 114. In the example of FIG. 1, the sealing key 102 is generated as the output 120 of the diode visualization 112 using the internal secret 110 as the key 114, the random seed 108 as the data 118, and a label 116 "Encrypt." In this manner, observing the sealing key 102, the "Encrypt" label 116, and the random seed 108 provides no way of deriving the internal secret 110 by reversing the KDF. The internal secret 110 can therefore be maintained as a secret that is exclusively accessible to the boot code (e.g., a bootloader) of the electronic device 100.

The generated sealing key 102 corresponds to the random seed 108 for the particular TMM 104, and simply observing the random seed 108 (which is stored publicly and is therefore accessible) cannot reveal the sealing key 102 without also knowing the internal secret 110. After generating the sealing key 102, access to the internal secret 110 is disabled for a remainder of the first boot session and until the electronic device 100 resets or reboots (i.e., until a second boot session is initiated). Disabling access to the internal secret 110 can comprise setting a register, which makes the hardware-based key of an eFuse device unreadable for a remainder of the first boot session. The register can then be "unset" upon initiation of the next boot session. With the GUID 106, the random seed 108, and the sealing key 102 written to fields of the TMM 104, the partially-populated TMM 104 can be stored in non-volatile memory of the electronic device 100, such as the hard drive of the electronic device 100, until an OS is installed on the electronic device 100 and more fields are populated to create a module manifest, as will be described in more detail below. Once an OS is installed on the electronic device 100, the sealing key 102 can be used to "seal" secrets, such as by encrypting a randomized key used for hard drive encryption.

Figure 2:
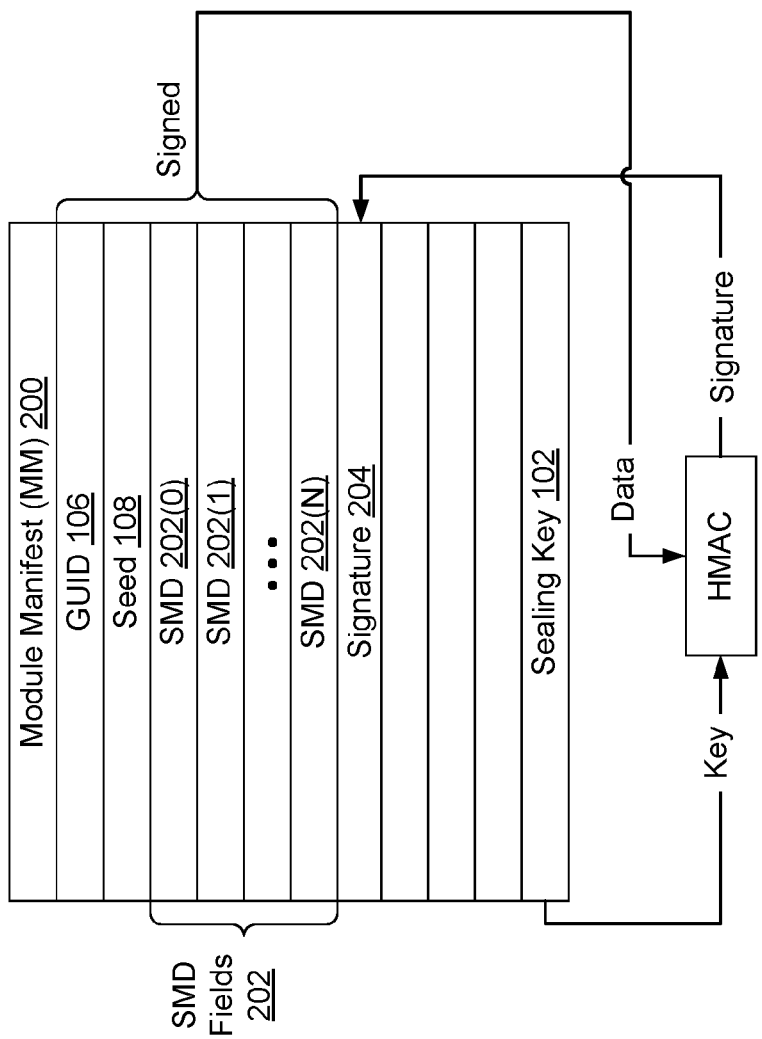
FIG. 2 is a schematic diagram showing an example technique of signing a module manifest used for boot policy validation.

FIG. 2 is a schematic diagram showing an example technique of signing a module manifest (MM) 200 used for boot policy validation. The module manifest 200 of FIG. 2 represents a data structure that is created as a result of populating additional fields of the TMM 104, which was shown and described with reference to FIG. 1. The additional fields that are populated to create the module manifest 200 can include, without limitation, a plurality of software module descriptor (SMD) fields 202 and a field for a signature 204.

During the initial (first) boot session of the electronic device 100, and after the sealing key 102 is generated, code measurements of multiple boot stages for the first boot session can be calculated, and the code measurements can be written to the SMD fields 202. In this manner, the module manifest 200 describes, or defines, the current software stack (or the current state of the software) running on the electronic device 100 via the SMD fields 202. At least some of the SMD fields 202 can contain code measurements of an OS that the user has installed on the electronic device 100 so that the current software stack includes an OS version installed on the electronic device 100. Prior to installing an OS on the electronic device 100, a software validation module of the electronic device 100 can verify that the OS is safe to install on the electronic device 100 by performing one or more verification operations. The verification operations can include, without limitation, receiving user input from a user (the user having previously logged into the electronic device 100 using a passphrase), receiving a valid passphrase, detecting an authorized smart card, and so on. Successful completion of one or more verification operations can ensure that the OS is safe to install on the electronic device 100.

The code measurements written to the SMD fields 202 can comprises any suitable type of code measurements, such as a set of hashes of portions (or elements) of the current software stack on the electronic device 100. Thus, SMD 202(0), SMD 202(1), . . . SMD 202(N) can describe a set, or list, of hashes of the current software elements itself, or options (e.g., whether debugging is enabled or disabled with the current software stack), and the like. The SMD fields 202 can maintain any type of code measurements that are relevant to the security of on-device secrets and that, when modified, could otherwise allow an attacker to access the on-device secrets. As an illustrative example, SMD 202(0) can represent a boot stage of multiple boot stages in a boot process for the first boot session, SMD 202(1) can represent a next, sequential boot stage in the boot process (e.g., a "secure loader" stage), SMD 202(2) can represent the OS bootloader, SMD 202(N) can represent the kernel, and so on. Thus, at least some of the SMD fields 202 can describe boot stages of a boot process and others of the SMD fields 202 can describe a version of the OS that the user installed on the electronic device 100 and that was verified as safe to install through one or more verification operations. The aforementioned examples of SMD code measurements are implementation specific, however, and different software stacks can be utilized without departing from the basic characteristics of the techniques and systems described herein.

At runtime, and as the electronic device 100 is used by a user, data (e.g., user data) can be encrypted using the sealing key 102, and the encrypted data can be stored in non-volatile memory of the electronic device 100. For example, data to be stored on the hard drive (e.g., a hard disk drive (HDD)) of the electronic device 100 can be encrypted using randomized application-specific keys used for hard drive encryption (e.g., BitLocker® volume keys or similar hard drive encryption keys), and these application-specific keys used for hard drive encryption can be encrypted (or wrapped) using the sealing key 102.

In order to sign the module manifest 200 and to persist the module manifest 200 in non-volatile memory of the electronic device 100, the sealing key 102 can be used to generate the signature 204 shown in FIG. 2. The same, or a similar, diode visualization 112 shown in FIG. 1 can be utilized to generate the signature 204 such that the signature 204 can be based in part on the sealing key 102 and in part on the code measurements (e.g., hashes of the software elements of the current software) that were written to the SMD fields 202 and calculated during the first boot session. That is, a cryptographic primitive (e.g., a HMAC algorithm) used as a KDF can take, as input, the sealing key 102 as the secret key 114, the code measurements in the SMD fields 202 (or the random seed 108 concatenated with the code measurements in the SMD fields 202) as the data 118, and possibly a label, and can produce the signature 204 as the output 120. In this manner, simply observing the signature 204, the random seed 108, and the code measurements in the SMD fields 202 provides no way of deriving the secret sealing key 102, and the sealing key 102 can therefore be kept private and secure from unauthorized software and processes.

The signature 204 can be used to sign (e.g., symmetrically sign) at least a portion of the module manifest 200, such as the code measurements in the SMD fields 202, and possibly to sign the random seed 108 and/or the GUID 106. The signed module manifest 200 can be left unencrypted so that the module manifest 200 is public and readable by any software or process on the electronic device 100, and the signed module manifest 200 can be persisted (or stored) in non-volatile memory of the electronic device 100. The module manifest 200 can correspond to the installed OS version such that a one-to-one correspondence between each module manifest 200 and each OS version is created. In this manner, the electronic device 100 can be configured to run multiple OS versions installed thereon, and a corresponding module manifest 200 for each OS version can be persisted in non-volatile memory of the electronic device 100. Once persisted in non-volatile memory of the electronic device 100, the signed module manifest 200 can be utilized during any subsequent boot session to verify that the software that the electronic device 100 is actually booting is the same as the software that is described in the module manifest 200 via the SMD fields 202. It is to be appreciated that the code measurements in the SMD fields 202 and the signature 204 can be maintained in a public portion of the module manifest 200, while the sealing key 102 is securely stored in memory of the electronic device 100.

Figure 3:
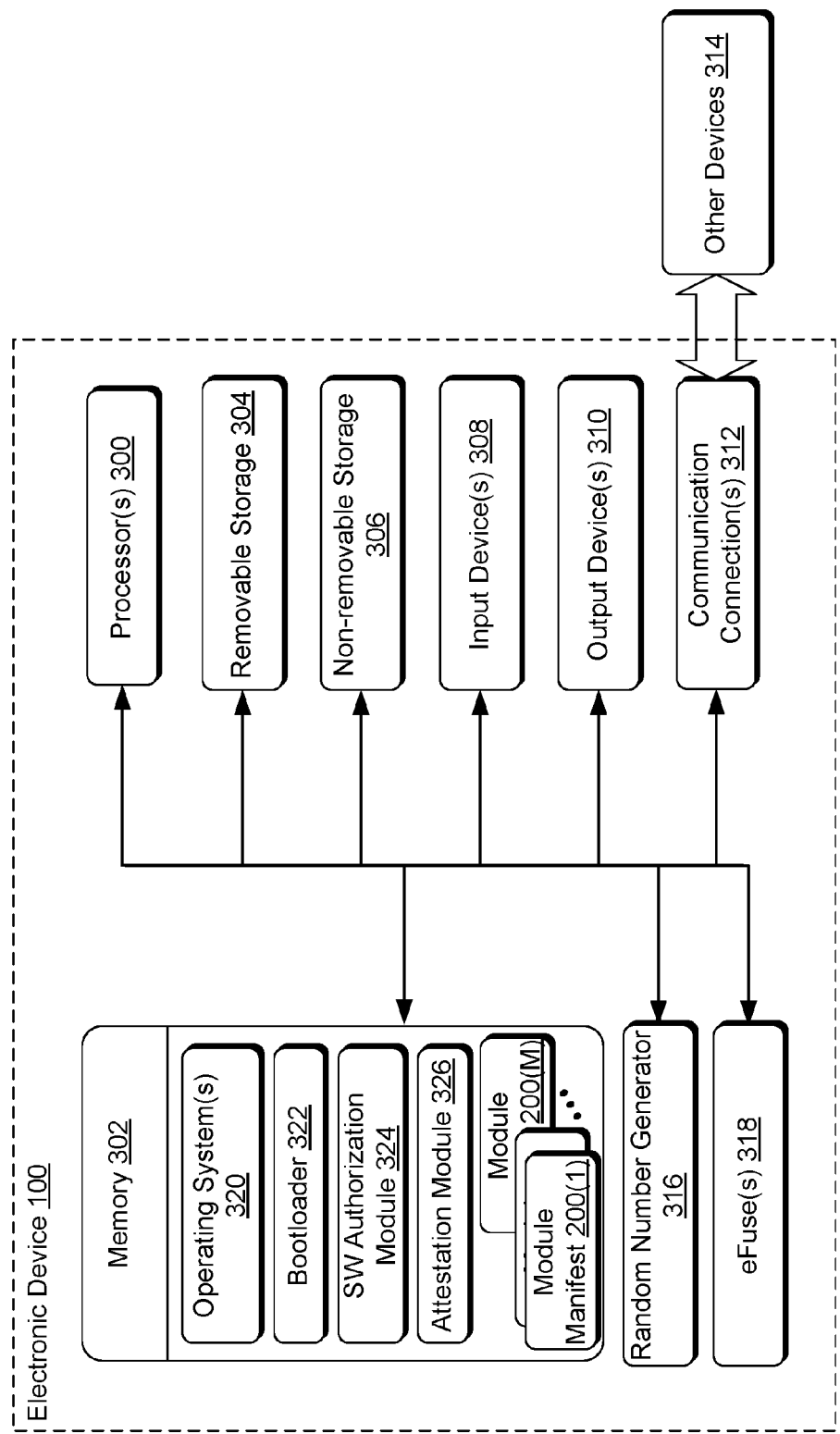
FIG. 3 is a schematic diagram of an example electronic device architecture configured to implement the techniques described herein.

FIG. 3 is a schematic diagram of an example electronic device 100 architecture configured to implement the techniques described herein. The electronic device 100 can be implemented as any type of computing device including, but not limited to, a personal computer, a laptop computer, a tablet computer, a portable digital assistant (PDA), a mobile phone (e.g., a smart phone), an electronic book (e-book) reader, a game console, a set-top box (STB), a smart television (TV), a media streaming player, a portable game player, a portable media player, a wearable computer (e.g., a smart watch, smart glasses, etc.), and so forth.

FIG. 3 shows the electronic device 100 as including one or more processors 300 and memory 302. In some configurations, the processor(s) 300 can include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof. Depending on the exact configuration and type of electronic device 100, the memory 302 can include volatile (e.g., random access memory (RAM)), non-volatile (e.g., read only memory (ROM), flash memory, etc.), or some combination of the two.

The electronic device 100 can also include additional data storage devices (removable and/or non-removable) such as, for example, magnetic disks, optical disks, or tape. Such additional storage is illustrated in FIG. 3 by removable storage 304 and non-removable storage 306. Computer-readable media, as used herein, can include, at least, two types of computer-readable media, namely computer storage media and communication media. Computer storage media can include volatile and nonvolatile, removable and non-removable media implemented in any method or technology for storage of information, such as computer readable instructions, data structures, program modules, or other data. The memory 302, removable storage 304 and non-removable storage 306 are all examples of computer storage media. Computer storage media includes, but is not limited to, RAM, ROM, electrically erasable programmable read-only memory (EEPROM), flash memory or other memory technology, compact disk read-only memory (CD-ROM), digital versatile disks (DVD), or other optical storage, magnetic cassettes, magnetic tape, magnetic disk storage or other magnetic storage devices, or any other non-transmission medium that can be used to store desired information and data that can be accessed by the electronic device 100.

In some configurations, any or all of the memory 302, removable storage 304, and non-removable storage 306 can store programming instructions, data structures, program modules and other data, which, when executed by the processor(s) 300, implement some or all of the processes described herein. Furthermore, non-volatile memory of any of the memory 302, removable storage 304, and/or non-removable storage 306 can be used to maintain the aforementioned TMM 104 of FIG. 1, the module manifest 200 of FIG. 2, and user data that is to be persisted in memory of the electronic device 100 and remain available after rebooting the electronic device 100.

In contrast, communication media can embody computer-readable instructions, data structures, program modules, or other data in a modulated data signal, such as a carrier wave, or other transmission mechanism. As defined herein, computer storage media does not include communication media.

The electronic device 100 can also comprise input device(s) 308, such as a touch screen, keyboard, pointing devices (e.g., mouse, touch pad, joystick, etc.), pen, microphone, physical buttons, etc., through which a user can enter commands, information, and user input into the electronic device 100.

The electronic device 100 can further include one or more output devices 310 for providing output to a user of the electronic device 100. The output device(s) 310 can comprise, without limitation, a display, speakers, tactile feedback mechanisms, a printer, and so on.

The electronic device 100 can further include communication connections 312 (or communication interfaces 312) that allow the electronic device 100 to communicate with other computing devices 314, such as over a network when the electronic device 100 is operate in a networked environment, such as over the Internet. The communication connections 312 are usable to, among other things, transmit/receive data over a network to/from the other devices 314, such as one or more computing devices, one or more servers, and so on. Additionally, the communications connection(s) 312 can enable WiFi-based communication such as via frequencies defined by the IEEE 802.11 standards, short range wireless frequencies such as Bluetooth®, or any suitable wired or wireless communications protocol that enables the electronic device 100 to interface with the other devices 314. For example, the communication connection(s) 312 can include a smart card reader to interface with a smart card that is external to the electronic device 100. This can allow an authorized user in possession of a smart card to authenticate himself/herself with the electronic device 100 during a verification operation, such as when a software update is being verified as safe to install on the electronic device 100.

The electronic device 100 can further include a random number generator (RNG) 316 configured to generate random (or pseudo random) numbers. The RNG 316 can be configured to generate the GUID 106 and the random seed 108, among other randomly generated values described herein. The electronic device 100 can further include an eFuse device 318, or a similar hardware chip, that contains an internal secret 110. The internal secret 110 can be "burned" or hard-coded into the eFuse device 318 at the time of manufacturing the eFuse device 318, and is unique to the electronic device 100. In some configurations, the internal secret 110 is known exclusively to the boot code of the electronic device 100. In other configurations, however, the internal secret 110 can be shared with another device 314, such as with another electronic device, or with an external database (e.g., a backup database). For example, if key "escrowing" is required by law, or if a business enterprise desires to keep a copy of the internal secret 110 for any reason, the internal secret 110 can be shared between the electronic device 100 and another device 314 to satisfy these objectives.

The memory 302 of the electronic device 100 can include one or more operating systems 320, such as one or more versions of an OS, a bootloader 322, a software authorization module 324, and an attestation module 326. Furthermore, the memory 302 can maintain one or more module manifests 200(1)-200(M), such as the module manifest 200 of FIG. 2, wherein each module manifest 200 corresponds to an OS 320 version on the electronic device 100.

The bootloader 322 can be configured to initiate boot sessions for the electronic device 100, and to load multiple boot stages in sequence during an initiated boot session. The bootloader 322 can further be configured to implement the device-local key derivation scheme and the boot policy validation technique described herein.

The software authorization module 324 can be configured to verify that new, unforeseen software to be installed on the electronic device 100 is safe to install prior to installing the new software. The software authorization module 324 can perform one or more verification operations in the context of verifying to-be-installed software. For example, verification operations implemented by the software authorization module 324 can include, without limitation, receiving a valid passphrase (e.g., password, personal identification number (PIN), etc.) via one or more of the input devices 308 of the electronic device 100, receiving an acknowledgment (e.g., user input selecting a soft button on a touch screen of the electronic device 100, user input pressing a physical button, a voice command received via a microphone(s), etc.), detecting an authorized smart card at the electronic device 100 via the communication connection(s) 312, receiving an administrator passphrase, requesting verification, via the communication connection(s) 312 and over a computer network, from a remote server computer to confirm that the software update has not been flagged on a blacklist or otherwise revoked, and so on.

The attestation module 326 can be configured to carry out an attestation procedure, which utilizes the module manifest 200, as will be explained in more detail below. The attestation procedure implemented by the attestation module 326 ensures that the electronic device 100, when "talking" to an external computing device (e.g., a virtual private network (VPN) server), transmits cryptographic proof to the external computing device that the software version the electronic device 100 says it booted is the actual software version that the electronic device 100 booted.

Figure 4:
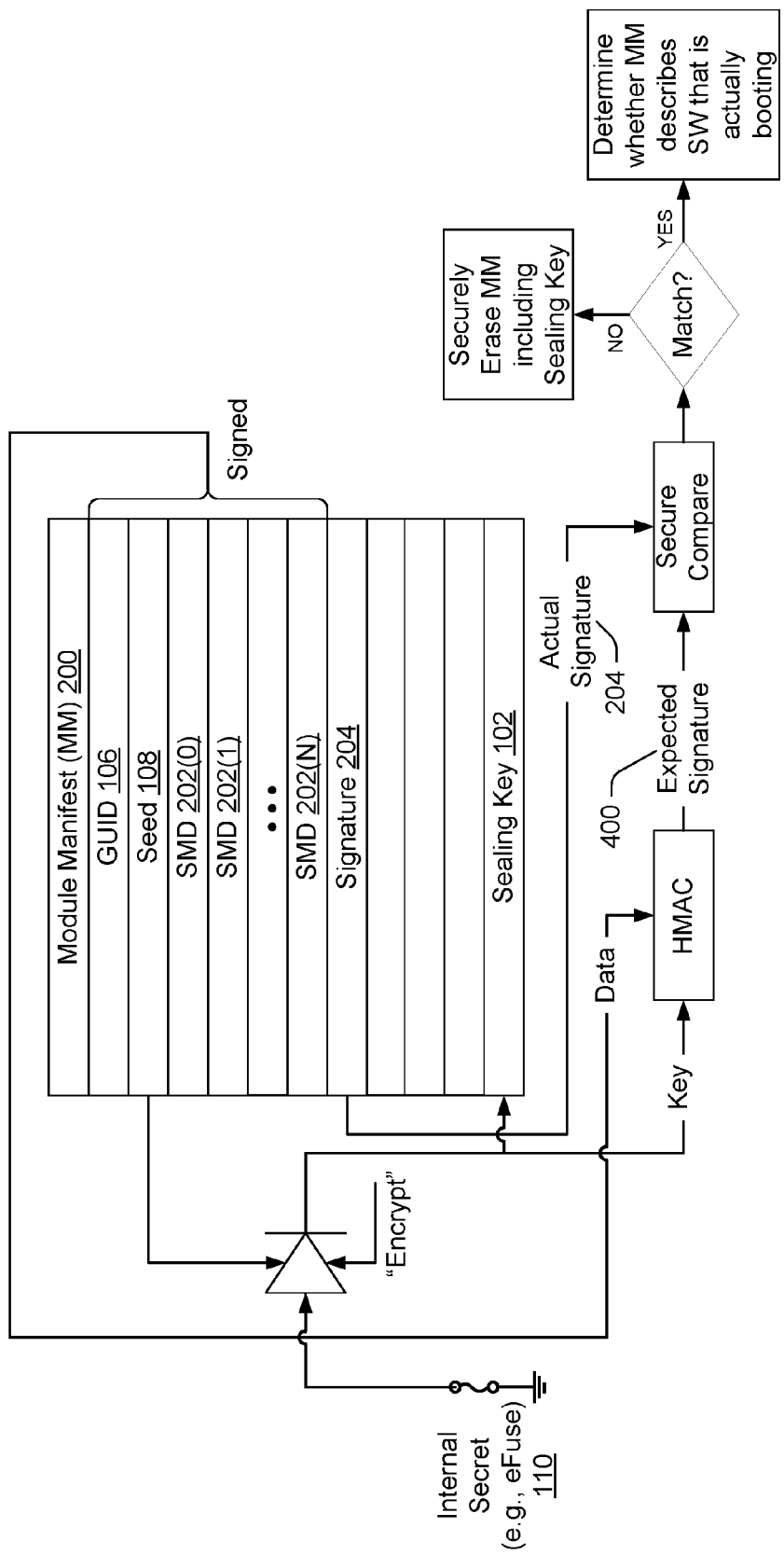
FIG. 4 is a schematic diagram showing an example boot policy validation technique using a module manifest.

FIG. 4 is a schematic diagram showing an example boot policy validation technique using a module manifest 200. FIG. 4 is described in the context of the electronic device 100 that has completed a first boot session, persisted the signed module manifest 200 in non-volatile memory of the electronic device 100, and is initiating a second boot session. For example, the second boot session can be initiated after completion of the first boot session (either an initial boot session or the previous boot session) and after shutting down or restarting the electronic device 100. The reboot of the electronic device 100 enables access by the bootloader 322 of the electronic device 100 to the internal secret 110 (or eFuse secret 110), which was previously disabled after generation of the sealing key 102 during the first boot session of the electronic device 100.

During the second boot session, the module manifest 200 that was previously persisted in non-volatile memory of the electronic device 100 can be loaded and validated before the second boot session completes. It is to be appreciated that, in some configurations, a template module manifest 104 can be generated upon each boot session of electronic device 100 so that the current software can migrate to a new sealing key 102, if desired. Such a template module manifest 104 can be generated regardless of whether the previously persisted module manifest 200 is determined to be valid or not.

In order to validate the module manifest 200, the bootloader 322 can read the random seed 108 from the module manifest 200 (note that a new random seed is not generated, but the same random seed 108 that was generated during the first boot session is read from the module manifest 200), and the bootloader 322 can regenerate the sealing key 102 based in part on the random seed 108 read from the module manifest 200 and in part on the internal secret 110 that has been re-enabled for the second boot session. The same, or a similar, diode visualization 112 as shown and described with reference to FIG. 1 can be used to regenerate the sealing key 102 using a cryptographic primitive (e.g., a HMAC algorithm). The regenerated sealing key 102 is the same as the sealing key 102 that was generated during the initial (first) boot because the same random seed 108 and the same internal secret 110 can be used with the same cryptographic primitive to regenerate the same sealing key 102. After the sealing key 102 is regenerated, access to the internal secret 110 can again be disabled for a remainder of the second boot session and until a subsequent (third) boot session is initiated.

The bootloader 322 can then generate an expected signature 400 that can be used to validate the module manifest 200 with the actual signature 204 in the module manifest 200. The expected signature 400 can be generated based in part on the sealing key 102 that was regenerated during the second boot session and in part on code measurements that are read from the module manifest 200 (i.e., the hashes read from the SMD fields 202 in the module manifest 200. Again, the same, or a similar, diode visualization 112 as shown and described with reference to FIG. 1 can be utilized for generating the expected signature 400 in FIG. 4.

As shown in FIG. 4, the expected signature 400 can be compared to the actual signature 204 read from the module manifest 200, and if the compared signatures do not match, the sealing key 102 can be securely erased from memory of the electronic device 100 along with the module manifest 200 as a security measure to prevent modified code and/or attackers from accessing the sealing key 102. If, on the other hand, the compared signatures (i.e., the expected signature 400 and the actual signature 204) match, the bootloader 322 can determine whether the module manifest 200 describes the software that the electronic device 200 is actually booting (e.g., by verifying that the remaining boot stages of the second boot session match the set of signed boot stages in the module manifest 200). The set of signed boot stages were previously written to at least some of the SMD fields 202. The determination of whether the module manifest 200 describes the software that is actually booting is described with reference to FIG. 5.

Figure 5:
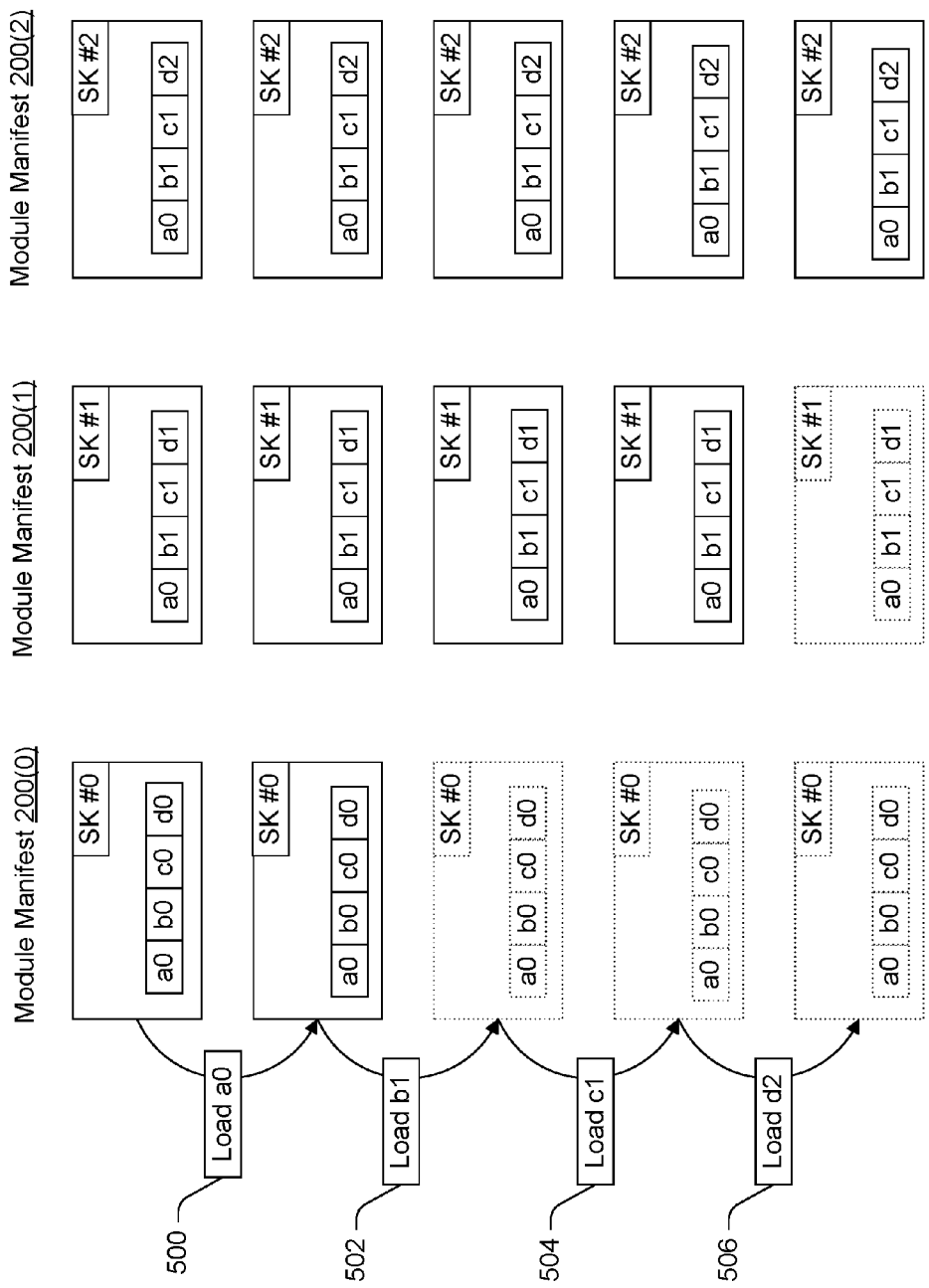
FIG. 5 is a schematic diagram showing an example technique of verifying multiple boot stages of a boot session during boot policy validation.

FIG. 5 is a schematic diagram showing an example technique of verifying multiple boot stages of a boot session during boot policy validation. The diagram shown in FIG. 5 is an extension from the technique shown in FIG. 4 in a scenario where the expected signature 400 matches the actual signature 204 during the process of validating the module manifest 200. FIG. 5 shows three module manifests 200(0), 200(1), and 200(2) for illustrative purposes. The three module manifests 200(0)-(2) can represent independent module manifests 200 that each correspond to a separate OS version installed on the electronic device 100, or the three module manifests 200(0)-(2) can represent three different instances of booting the electronic device 100 with the same module manifest 200, but actually booting the electronic device 100 with three different software stacks for comparing and contrasting the different scenarios that can occur. The point of verifying the multiple boot stages in the manner shown in FIG. 5 is to prevent the sealing key 102 from being made available to modified code/software.

As shown in FIG. 5, each time a boot stage is loaded, the bootloader 322, or the current boot stage, calculates a code measurement of the loaded boot stage (e.g., a hash of the boot stage) and verifies that the calculated code measurement matches the corresponding code measurement in the relevant SMD field 202 of the module manifest. For example, the bootloader 322 can validate the first boot stage (e.g., the hash of the first boot stage) of a boot session, and securely erase one or more module manifests 200 that do not have matching code measurements (e.g., hashes). Subsequently, execution proceeds for the boot session and the first boot stage can validate the second boot stage, and so on, where the current boot stage securely erases one or more module manifests 200 that do not have matching code measurements. In a scenario where the three module manifests 200(0)-(2) represent multiple different module manifests 200 on the electronic device 100, the code measurement of a current boot stage can be calculated and verified against each active module manifest's 200 SMD/code measurement at the current index. At each boot stage, this verification step is done prior to passing control to the next boot stage so that if the calculated code measurement (e.g., hash) of the loaded boot stage of the software actually being booted does not match the code measurement (e.g., hash) in the relevant SMD field 202 of the module manifest 200, the sealing key 102 is securely erased from the electronic device 100 along with the module manifest 200. This is because if the compared code measurements are not matching, this indicates that module manifest 200 does not describe the software that the electronic device 100 is actually booting; meaning that the software being booted is modified, or otherwise unfamiliar, with respect to the software that was authorized to access the sealing key 102 during the first boot session.

Walking through the diagram of FIG. 5, when a second boot session is initiated for the electronic device 100 and after the module manifest 200 has been validated per the technique shown and described with reference to FIG. 4, a first boot stage of the second boot session is loaded (e.g., boot stage 500, with the label "a0" in FIG. 5), and the code measurement of the first boot stage 500 can be calculated and compared to the corresponding code measurements for the first boot stage of the first boot session that were written to the manifests 200(0)-(2). In the example of FIG. 5, all of the module manifests 200(0)-(2) have a code measurement that matches the code measurement of the first boot stage 500 of the second boot session, so control passes to the next boot stage.

The second boot stage of the second boot session (e.g., boot stage 502, labeled "b1" in FIG. 5) is then loaded, and the code measurement of the second boot stage 502 can be calculated and compared to the corresponding code measurements for the second boot stage of the first boot session that were written to the module manifests 200(0)-(2). In the example of FIG. 5, module manifests 200(1) and 200(2) each have a code measurement that matches the code measurement of the second boot stage 502 of the second boot session, so control passes to the next boot stage for both of module manifest 200(1) and module manifest 200(2). However, the module manifest 200(0) contains a code measurement (e.g., the hash of "b0") that does not match the code measurement (e.g., the hash of "b1") of the second boot stage 502 of the second boot session, so the module manifest 200(0) is securely erased from memory of the electronic device 100 including the sealing key 102 within the module manifest 200(0).

When the third boot stage of the second boot session (e.g., boot stage 504, labeled "c1" in FIG. 5) is loaded, the code measurements corresponding the third boot stage in the remaining module manifests 200(2) are compared to the code measurement calculated for the third boot stage of the second boot session. Here, both of the module manifests 200(1) and 200(2) have a code measurement that matches the code measurement of the third boot stage 504 of the second boot session, so control passes to the next boot stage. When the fourth boot stage of the second boot session (e.g., boot stage 506, labeled "d2" in FIG. 5) is loaded, the module manifest 200(2) is determined to have a code measurement that matches the code measurement of the fourth boot stage 506 of the second boot session, so control passes to the next boot stage for the module manifest 200(2). If this is the final boot stage, the second boot session completes for the module manifest 200(2). FIG. 5 shows that the module manifest 200(1) contains a code measurement (e.g., the hash of "d1") that does not match the code measurement (e.g., the hash of "d2") of the fourth boot stage 506 of the second boot session, so the module manifest 200(1) is securely erased from memory of the electronic device 100 including the sealing key 102 within the module manifest 200(1) prior to passing control to the next boot stage.

In FIG. 5, the electronic device 100 completes the second boot session with the module manifest 200(2), and the sealing key 102 (SK #2 in FIG. 5) in the module manifest 200(2) is retained in the module manifest 200(2) for exclusive access by the software running on the electronic device 100. However, the electronic device 100 would not have access to the sealing keys 102 in the module manifests 200(0) and 200(1), which means that the boot policy validation detected that the code had been modified, so on-device secrets are protected from unauthorized access with respect to the module manifests 200(0) and 200(1). It is to be appreciated that, if an attacker modified code in an effort to gain access to on-device secrets, the verification of boot stages might result in the scenarios shown in FIG. 5 with respect to the module manifest 200(0) and the module manifest 200(1). If there is no security mechanism that checks for a valid signature on the attacker's modified software, the attacker might be able to boot the electronic device 100, but the boot policy validation described herein would prevent the attacker's modified software from gaining access to on-device secrets because the sealing key 102 that was used to wrap (encrypt) data on the electronic device would be securely erased after the boot policy validation of FIGS. 4 and 5.

The processes described herein are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement a process. Moreover, in some configurations, one or more blocks of a process can be omitted entirely.

Figure 6:
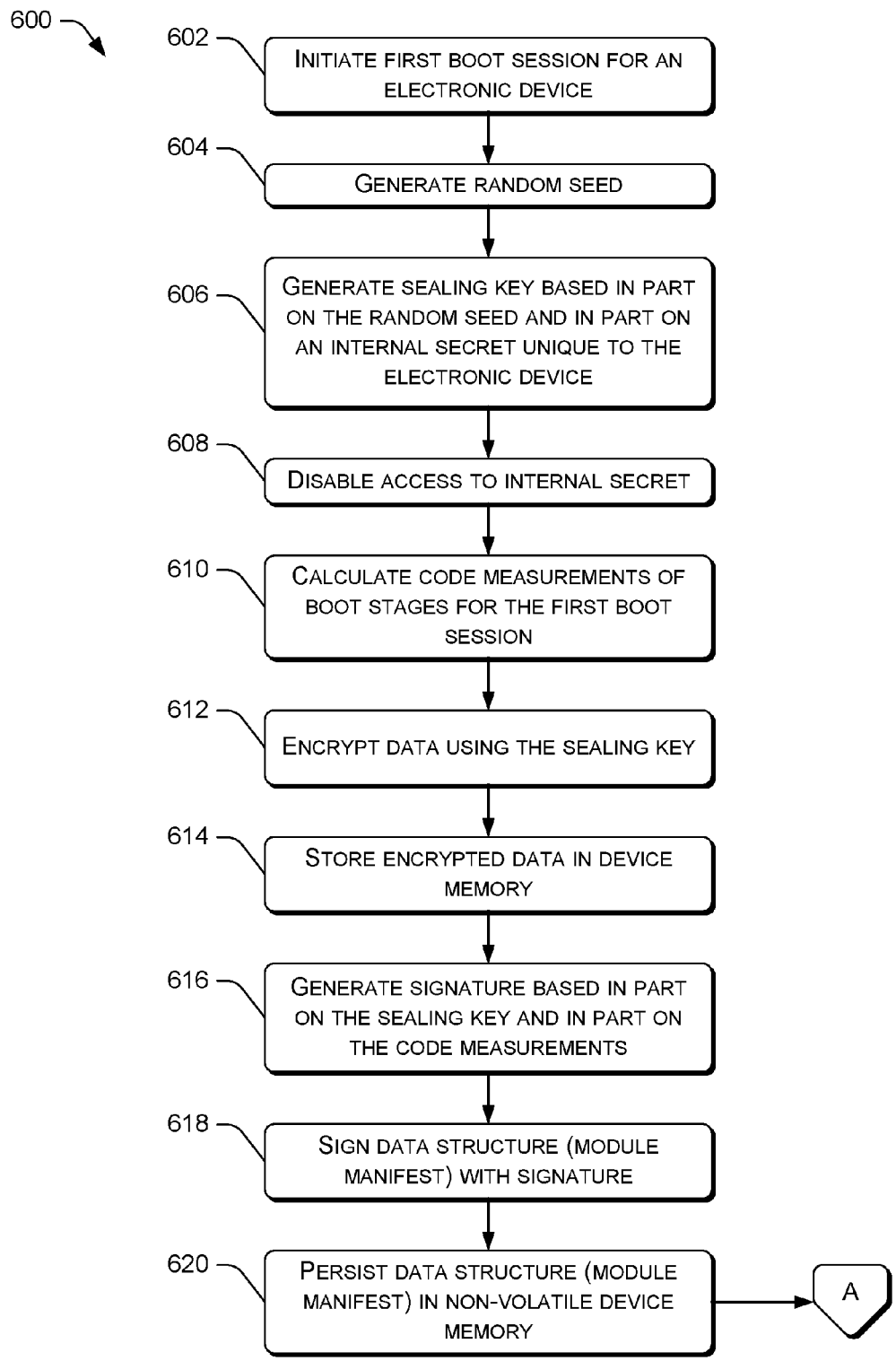
FIG. 6 is a flow diagram of an example process for locally deriving a sealing key at an electronic device and signing a module manifest that is to be used for boot policy validation.

FIG. 6 is a flow diagram of an example process 600 for locally deriving a sealing key 102 at an electronic device 100 and signing a module manifest 200 that is to be used for boot policy validation. The process 600 is described with reference to the previous figures. Particular reference is made to the bootloader 322, the random number generator 316, and the eFuse device(s) 318 of the electronic device 100.

At 602, a first boot session for an electronic device 100 can be initiated. For example, a user can power on the electronic device 100. In some configurations, the electronic device 100 can be "out-of-the-box" in the sense that the electronic device 100 does not yet have an installed OS.

At 604, a random seed 108 can be generated using a random number generator (RNG) 316 of the electronic device 100. At 606, a sealing key 102 can be generated based in part on the random seed 108 and in part on an internal secret 110 (i.e., internal to the electronic device 100) that is unique to the electronic device 100. The internal secret 110 can comprise a hardware-based key, as described herein, such as an eFuse secret 110 that is programmed into an eFuse device 318 at the time of manufacturing the eFuse device 318. The generation of the sealing key 102 at 606 can be based on a KDF that uses a cryptographic primitive (e.g., a HMAC algorithm), as described herein.

At 608, access to the internal secret 110 can be disabled for a remainder of the first boot session and until a second boot session is initiated (i.e., until the electronic device 100 resets or reboots). For example, disabling access to the internal secret 110 can be accomplished by setting a register that disables access to the internal secret 110 by the bootloader 322 or any other software or process.

At 610, code measurements of multiple boot stages for the first boot session can be calculated. For example, a first hash of a first boot stage of the first boot session can be calculated, a second hash of the second boot stage of the first boot session can be calculated, and so on, for a configurable number of boot stages in the boot path for the first boot session.

At 612, and at runtime of the electronic device 100, data on the electronic device 100 can be encrypted using the sealing key 102 to obtain encrypted data. For example, upon installation of an OS 320, the sealing key 102 can be used to wrap (or encrypt) a randomized application-specific key (e.g., a BitLocker® volume key) that is used for hard drive encryption. In this manner, data (e.g., user data) stored on the electronic device 100 can be encrypted with the locally-derived, random, private sealing key 102 known exclusively to the electronic device 100.

At 614, the encrypted data can be stored in non-volatile memory of the electronic device 100 so that it is persisted upon reboot of the electronic device 100.

At 616, a signature 204 can be generated based in part on the sealing key 102 and in part on the code measurements calculated at 610. The generation of the signature 204 can be performed using the same, or a similar, cryptographic primitive used for generation of the sealing key 102. As such, observing the signature 204 and the code measurements cannot yield the sealing key 102 by reversing the signature generation at 616.

At 618, at least a portion of a data structure (i.e., a module manifest 200) can be signed using the signature 204 generated at 616. The signed data structure (or module manifest 200) can include the code measurements in the SMD fields 202, the random seed 108, the signature 204, and the sealing key 102. At least the sealing key 102 can be maintained in a private portion of the module manifest 200 while the random seed 108, code measurements in the SMD fields 202, and the signature 204 can be publicly readable by any software or process on the electronic device 100.

At 620, the signed data structure (or module manifest 200) can be persisted in the non-volatile memory of the electronic device 100. In this manner, upon any subsequent reboot of the electronic device 100, the persisted module manifest 200 can be loaded for use in boot policy validation, as described herein.

Figure 7A:
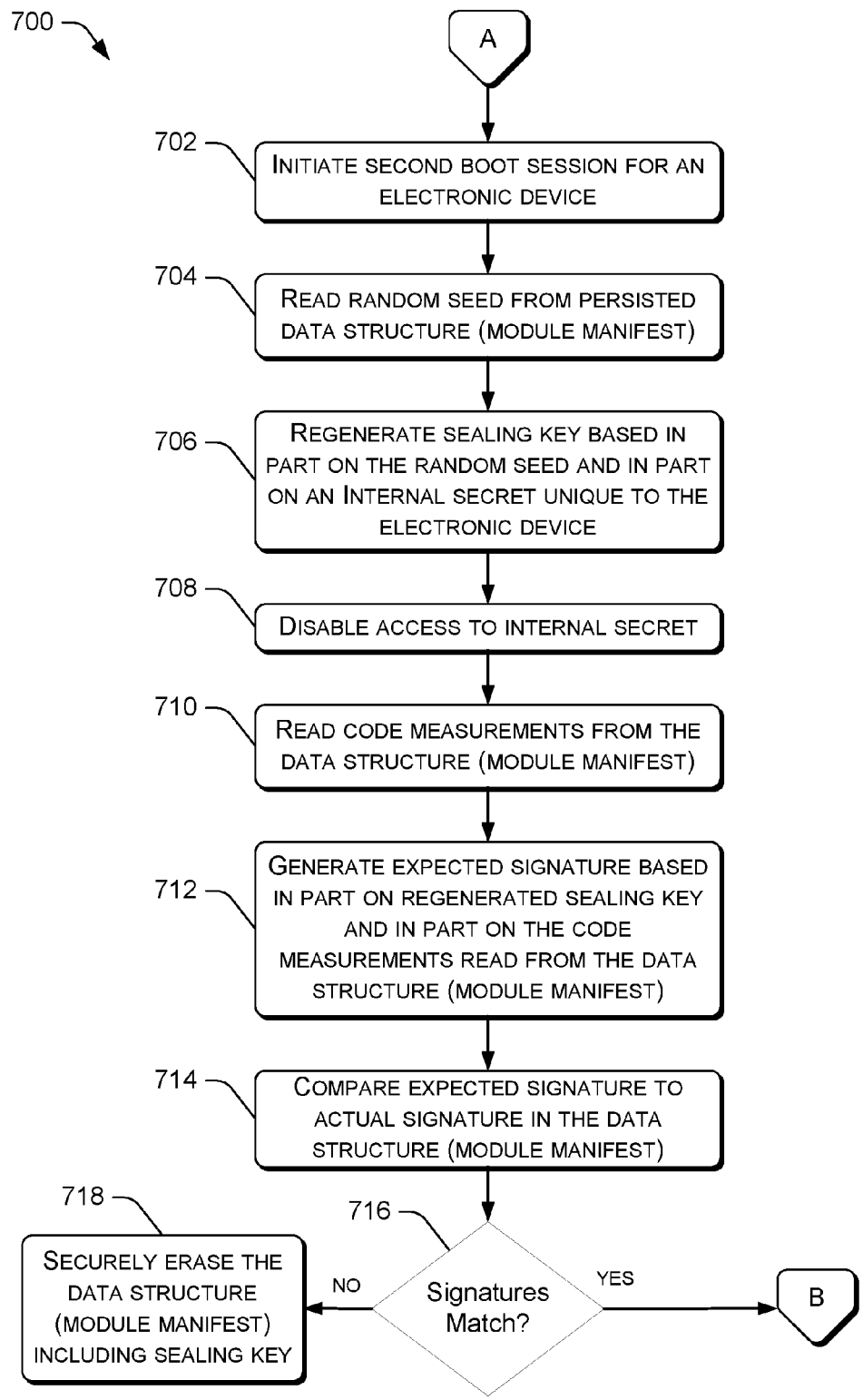
FIG. 7A is a flow diagram of an example process for implementing a portion of a boot policy validation procedure using a persisted module manifest of an electronic device.

FIG. 7A is a flow diagram of an example process 700 for implementing a boot policy validation procedure using a persisted module manifest 200 of an electronic device 100. The process 700 is described with reference to the previous figures. Particular reference is made to bootloader 322. The process 700 can continue from 620 of the process 600 of FIG. 6, as shown by the off-page reference "A" in FIGS. 6 and 7.

At 702, a second boot session can be initiated after completion of the first boot session of FIG. 6, or any intermediate, preceding boot session, and after shutting down or restarting the electronic device 100. It is to be appreciated that access to the internal secret 110 of the electronic device 100 is re-enabled at the initiation of the second boot session at 702 even though access to the internal secret 110 had been previously disabled at 608 of the process 600 in FIG. 6.

At 704, the random seed 108 can be read from the data structure (or module manifest 200) that was persisted in non-volatile memory of the electronic device 100.

At 706, the sealing key 102 can be regenerated based in part on the random seed 108 read at 704 and in part on the internal secret 110 available to the bootloader 322 of the electronic device 100. In this manner, the sealing key 102 regenerated at 706 is the same as the sealing key 102 generated at 606 of the process 600 in FIG. 6.

At 708, access to the internal secret 110 can be disabled for a remainder of the second boot session and until a third boot session is initiated.

At 710, the bootloader 322 can read the code measurements from the data structure (or module manifest 200), for example by reading the SMD fields 202 of the module manifest 200.

At 712, an expected signature 400 can be generated based in part on the sealing key 102 that was regenerated at 706 during the second boot session and in part on the code measurements that were read from the data structure (or module manifest 200) at 710 during the second boot session. Again, the generation of the expected signature 400 can be based on a KDF that uses a cryptographic primitive (e.g., a HMAC algorithm), as described herein.

At 714, the expected signature 400 can be compared to the actual signature 204 read from the data structure (or module manifest 200). At 716, a determination is made as to whether the expected signature 400 matches the signature 204 in the data structure (or module manifest 200). If the signatures do not match at 716, the process 700 proceeds via the "no" route to 718 where the data structure (or module manifest 200) including the sealing key 102 is securely erased from memory of the electronic device 100. If the signatures match at 716, the process 700 proceeds to the process 720 of FIG. 7B, as denoted by the off-page reference "B" in FIGS. 7A and 7B.

Figure 7B:
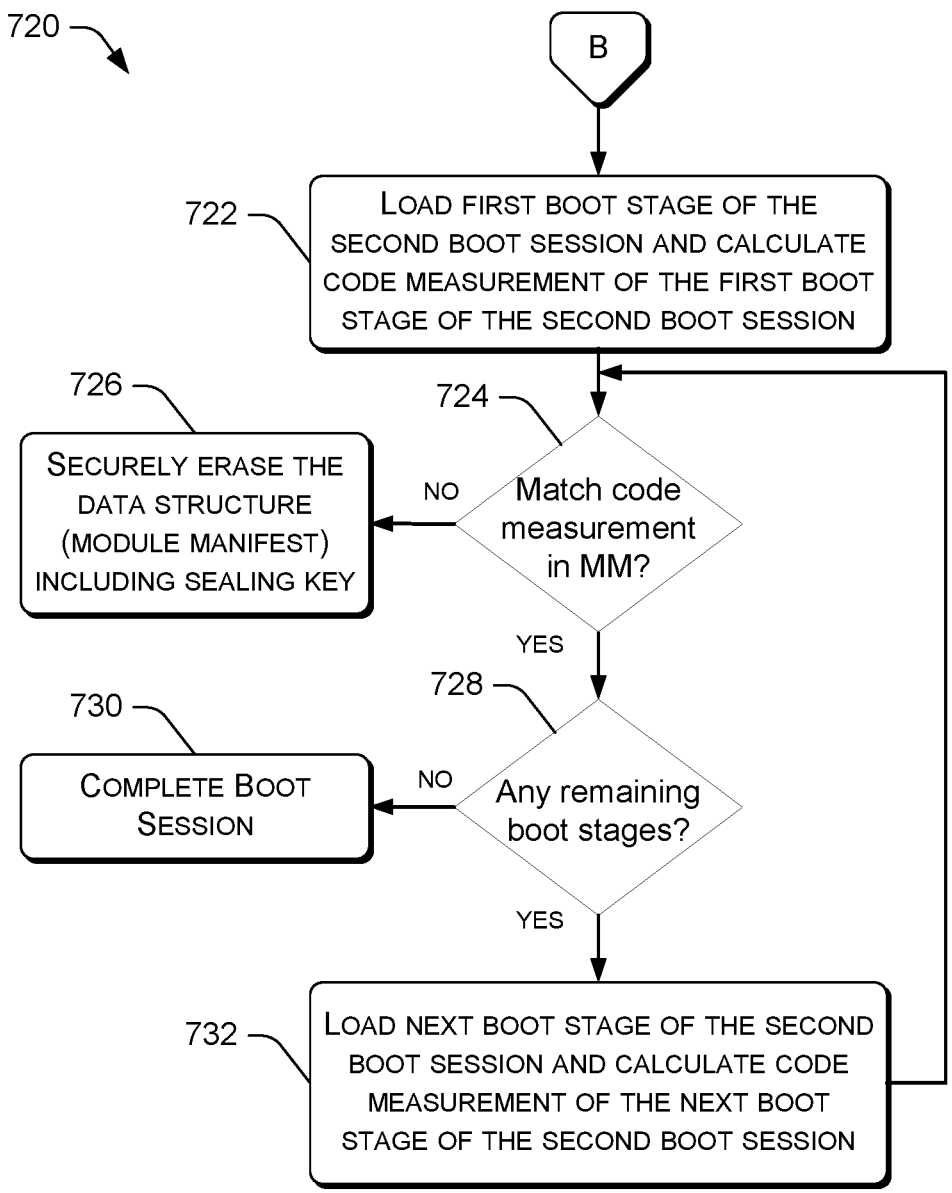
FIG. 7B is a flow diagram of an example process for implementing another portion of the boot policy validation procedure to verify that the module manifest describes the software that the electronic device is actually booting.

FIG. 7B is a flow diagram of an example process 720 for implementing another portion of the boot policy validation procedure initiated in FIG. 7A to verify that the module manifest 200 describes the software that the electronic device 100 is actually booting. The process 720 is described with reference to the previous figures and can continue from decision block 716 of the process 700 via the "yes" route, as denoted by the off-page reference "B" in FIGS. 7A and 7B.

At 722, following the "yes" route from decision block 716 in FIG. 7A (i.e., upon determining that the expected signature 400 matches the signature 204 in the data structure (or module manifest 200)), the bootloader 322 can load the first boot stage of the second boot session, and can calculate a code measurement (e.g., a hash) of the first boot stage of the second boot session.

At 724, a determination can be made, upon comparing the code measurement calculated at 722 to a corresponding code measurement from the SMD fields 202 of the data structure (or module manifest 200), as to whether the code measurement calculated at 722 matches the corresponding code measurement from the module manifest 200. If the code measurements do not match at 724, the process 720 proceeds via the "no" route to 726 where the data structure (or module manifest 200) including the sealing key 102 can be securely erased from the memory of the electronic device 100. If, on the other hand, the code measurements match at 724, the process 720 proceeds via the "yes" route to 728, where a determination is made as to whether there are any remaining boot stages in the boot session to be validated. If there are no remaining boot stages to be validated, the process 720 proceeds from 728 via the "no" route to 730 where the second boot session is completed. If it is determined at 728 that there are one or more remaining boot stages in the boot session, the process 720 proceeds via the "yes" route to 732, where the next boot stage of the second boot session is loaded, and the current boot stage calculates a code measurement (e.g., hash) of the next boot stage and compares the code measurement to a corresponding code measurement from the module manifest 200. Thus, the process 720 iterates for each boot stage in the boot path until either the boot stages are all verified and the second boot session is completed at 730, or until the first instance of a calculated code measurement not matching a corresponding code measurement from the data structure (or module manifest 200) at decision block 724, in which case, the module manifest 200 and sealing key 102 are securely erased at 726 and the second boot session is aborted or completes with no access being made to the sealing key so that on-device secrets are secured.

Figure 8:
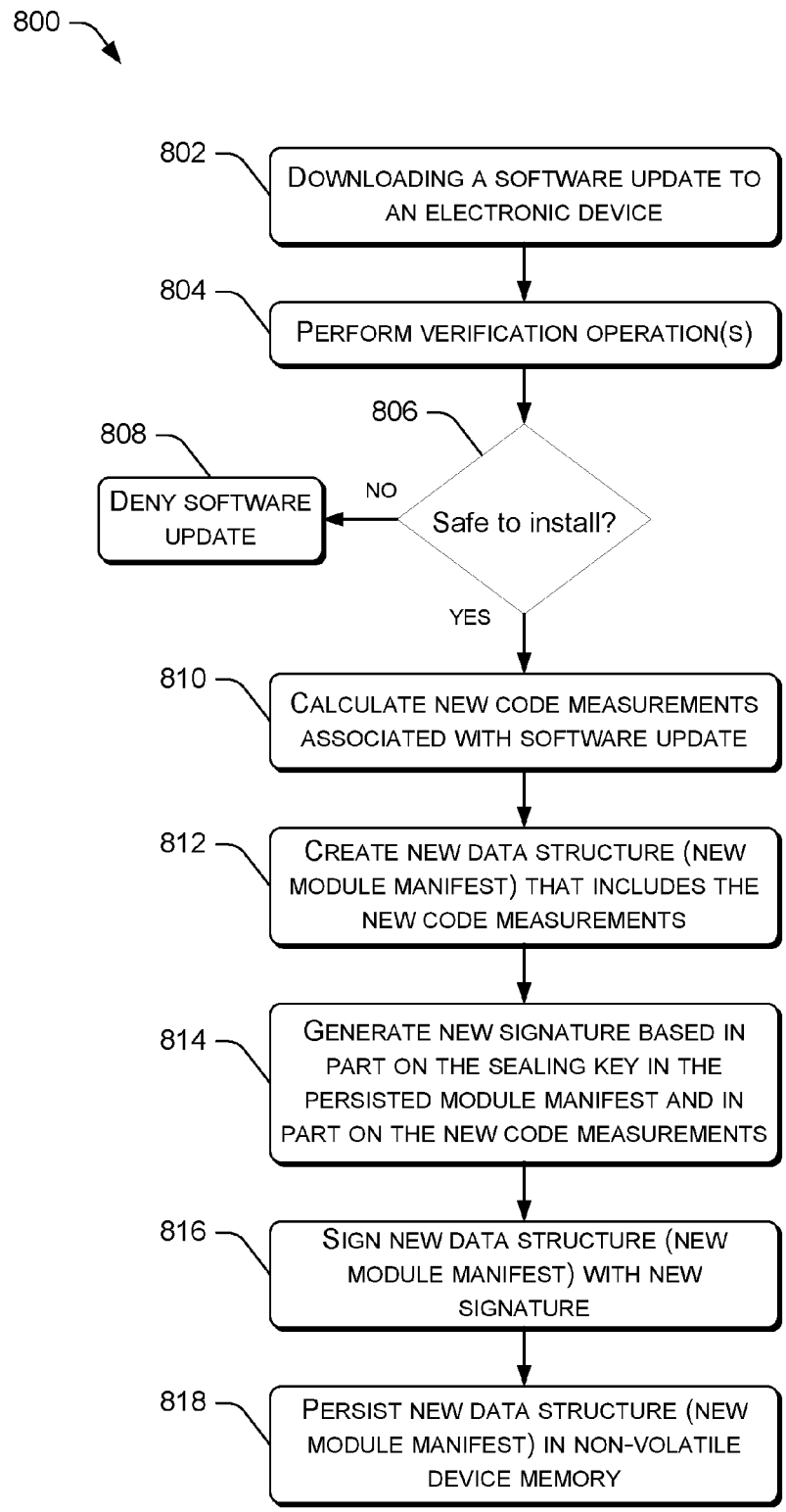
FIG. 8 is a flow diagram of an example process for updating software on an electronic device.

FIG. 8 is a flow diagram of an example process 800 for updating software on the electronic device 100. The process 800 is described with reference to the previous figures. Particular reference is made to software authorization module 324.

At 802, a software update can be downloaded to the electronic device 100. "Downloading" at 802 can comprise downloading the software update from a remote source (i.e., over a network via the communication connection(s) 312 of the electronic device 100, or from a local source (e.g., removable storage media, such as an optical disk having the software update stored thereon). It is to be appreciated the software update can be downloaded at 802 after having successfully booted the electronic device 100, such as after successfully booting the electronic device 100 using the process 600 of FIG. 6 and/or the processes 700 and 720 of FIGS. 7A and 7B. In this manner, an authorized user can be considered to have "logged in" to the electronic device 100, such as by providing a passphrase.

At 804, one or more verification operations can be performed to verify that the software update is safe to install on the electronic device 100. As described herein, a verification operation implemented by the software authorization module 324 can include, without limitation, receiving a valid passphrase (e.g., password, personal identification number (PIN), etc.) via one or more of the input devices 308 of the electronic device, receiving an acknowledgment (e.g., user input selecting a soft button on a touch screen of the electronic device 100, user input pressing a physical button, a voice command received via a microphone(s), etc.), detecting an authorized smart card at the electronic device 100 via the communication connection(s) 312, receiving an administrator passphrase, requesting verification, via the communication connection(s) 312 and over a computer network, from a remote server computer that the software update has not been flagged on a blacklist or otherwise revoked, and so on. A verification operation comprising a press of a physical button can be used to ensure that a human being physically present at the electronic device 100 (rather than a bot, or a remotely located human user) is authorizing the software update. Furthermore, a verification operation as simple as a button press (e.g., touching an "OK" soft button on a touch screen of the electronic device 100) can be sufficient for authorizing a software update because the user has to be logged in to press "OK," and the user can be made to enter a passphrase in order to login. So the user can be implicitly trusted in this scenario.

At 806, a determination is made as to whether the software update is safe to install on the electronic device 100. The determination at 806 can be based in part on the verification operation performed at 804. For example, a user can enter a passphrase at 804, and the determination at 806 can comprise a determination as to whether the passphrase matches a valid passphrase stored on the electronic device 100. If the software authorization module 324 determines that the software update is not safe to install at 806 (e.g., an incorrect passphrase was entered, a button was not pressed, etc.), the process 800 proceeds along the "no" route to 808 where the electronic device 100 is not updated with the software update.

If the software update is determined to be safe at 806 (e.g., if a button press was received, a correct passphrase was entered, an authorized smart card detected, etc.), the process 800 follows the "yes" route to 810 where new code measurements (e.g., hashes of elements of the new software) are calculated.

At 812, a new data structure (or module manifest 200) is created and the new code measurements are written to the SMD fields 202 of the new module manifest 200. The creation of a new module manifest 200 at 812 can leverage the previously-persisted module manifest 200 as a template, wherein the SMD fields 202 of the previously-persisted module manifest 200 are overwritten with the new code measurements (e.g., a list of new hashes). Alternatively, a copy of the previously-persisted module manifest 200 can be made and used to create the new module manifest 200 with the updated SMD fields 202 containing the new code measurements, and the previously-persisted module manifest 200 can be discarded after the new module manifest 200 is created and stored on the electronic device 100.

At 814, a new signature 204 can be generated based in part on the sealing key 102 from the previously-persisted module manifest 200 and in part on the new code measurements calculated at 810.

At 816, at least a portion of the new data structure (or module manifest 200) can be signed using the new signature 204 generated at 814, and at 818, the new data structure (or module manifest 200) can be persisted in non-volatile memory of the electronic device 100.

Figure 9:
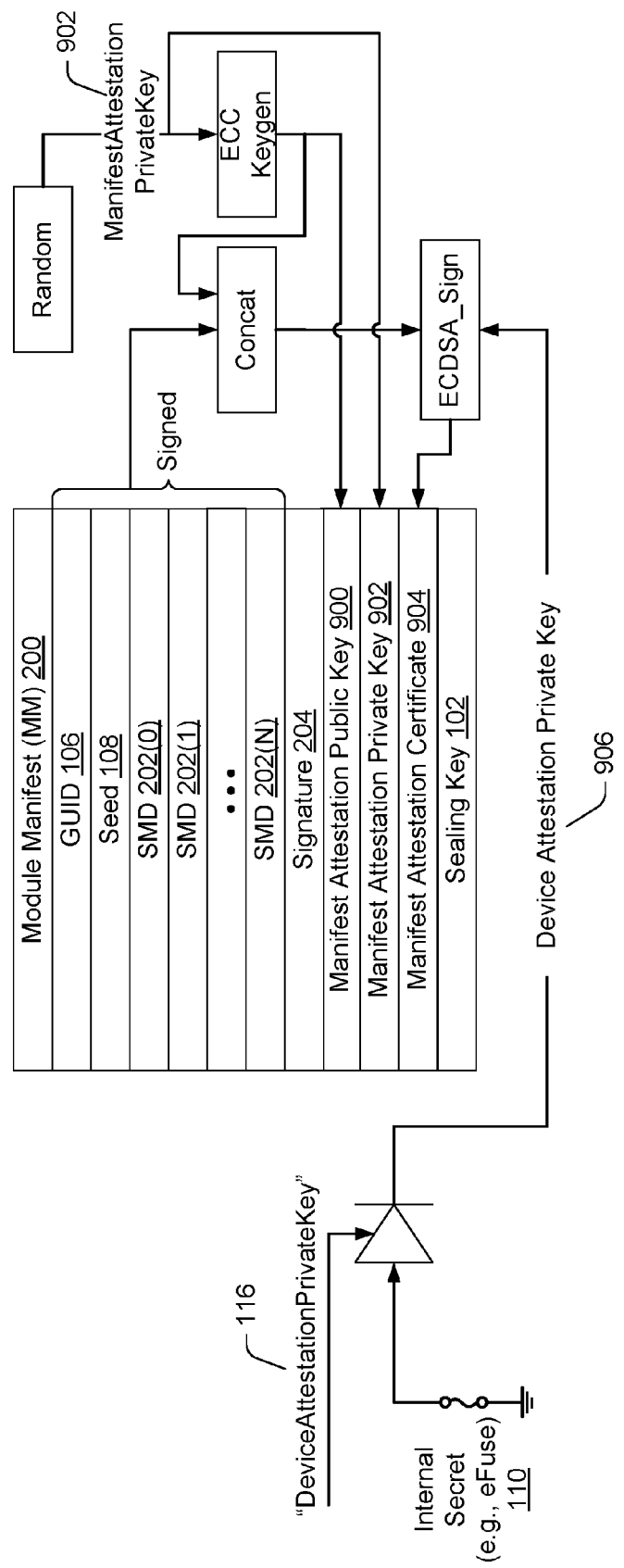
FIG. 9 is a schematic diagram showing an example attestation technique.

FIG. 9 is a schematic diagram showing an example attestation technique. The attestation technique of FIG. 9 allows the electronic device 100 to communicate with an external computing device (e.g., a remote server) via the communication connection(s) 312, and for the external computing device to verify that a particular software stack that the electronic device 100 "tells" the external computing device it is running is actually running on the electronic device 100. In other words, the attestation technique is a way for an external computing device to affirm that a software stack reported by the electronic device 100 is genuine.

FIG. 9 shows that the module manifest 200 can further include a manifest attestation public key 900, a manifest attestation private key 902, and a manifest attestation certificate 904 that are used, in combination with the aforementioned random seed 108 and the SMD fields 202, for attestation. The creation of these module manifest 200 elements can be accomplished as follows.

The RNG 316 of the electronic device 100 can create a randomized private key called the manifest attestation private key 902. The manifest attestation public key 900 can then be created based on the randomized manifest attestation private key 902 in order to obtain a public/private key pair. The generation of the manifest attestation public key 900 can utilized elliptic curve cryptography (ECC), as shown in FIG. 9. The public/private attestation key pair 900 and 902 can be written to respective fields of the module manifest 200. Note that the manifest attestation public key 900 can be maintained in a public portion of the module manifest 200 while the manifest attestation private key 902 can be maintained in a private portion of the module manifest 200.

The manifest attestation certificate 904 can then be generated, wherein the generation of the manifest attestation certificate 904 is based in part on the manifest attestation public key 900 and in part on the code measurements (e.g., hashes) from the SMD fields 202 of the module manifest 200, such as by concatenating the code measurements from the SMD fields 202 with the manifest attestation public key 900. The manifest attestation certificate 904 can also be based in part on the random seed 108, as depicted in FIG. 9 by concatenating the random seed 108 with the code measurements from the SMD fields 202 and the manifest attestation public key 900. The manifest attestation certificate 904 can also be based in part on a secret that is exclusively available to the bootloader 322 of the electronic device 100 called the device attestation private key 906 that is used to sign the manifest attestation certificate 904. The same, or a similar, diode visualization 112 shown and described with reference to FIG. 1 can be used with the internal secret 110 of the electronic device 100 and a label 116 "DeviceAttestationPrivateKey" to output the device attestation private key 906 at boot time of the electronic device 100 using a cryptographic primitive (e.g., a HMAC algorithm). The signing of the manifest attestation certificate 904 with the device attestation private key 906 can be based on an elliptic curve digital signature algorithm (ECDSA), as depicted in FIG. 9.

Because the manifest attestation certificate 904 is based in part on the manifest attestation public key 900, the manifest attestation certificate 904 can convey to an external computing device 314 that the manifest attestation public key 900 is trusted. Furthermore, because the manifest attestation certificate 904 is based in part on the code measurements from the SMD fields 202 of the module manifest 200, the manifest attestation certificate 904 describes the software stack running on the electronic device 100 and can convey this information to an external computing device 314. Lastly, because the manifest attestation certificate 904 is signed with the device attestation private key 906—a secret that is exclusively available to the bootloader 322 of the electronic device 100—the electronic device 100 can prove to an external computing device 314 that it is not lying about the current software stack running on the electronic device 100, because the external computing device 314 knows that the bootloader 322 of the electronic device 100 obtained the device attestation private key 906. It is noted that the manifest attestation certificate 904 can be maintained in a private portion of the module manifest 200, and the module manifest 200 containing the additional attestation fields can be persisted in non-volatile memory of the electronic device 100.

Consider a use case where the electronic device 100 successfully boots, and the module manifest 200 previously persisted in memory of the electronic device 100 remains available (i.e., the module manifest 200 is not securely erased as per the boot policy validation described herein). The OS 320 of the electronic device 100 can transmit data over a wide area network to a VPN server that is remotely located with respect to the electronic device 100. The electronic device 100 can transmit the manifest attestation certificate 904 to the VPN server, which acts as proof that the bootloader 322 signed a statement from the OS 320 specifying that the electronic device 100 is running a particular software stack (e.g., a particular OS 320 version). In order to prove that this statement from the OS 320 is genuine, the VPN server can transmit to the electronic device 100, and the electronic device 100 can receive via the communication connection(s) 312 and by the OS 320, a random number. The random number received from the VPN server can be signed with the manifest attestation private key 902, and the signed random number can be transmitted back to the VPN server over the wide area network. The VPN server can validate that the manifest attestation private key 902 was generated by the bootloader 322 because the corresponding manifest attestation public key 900 is part of the manifest attestation certificate 904, which was previously sent to the VPN server, and the VPN server knows that the manifest attestation certificate 904 was signed by the bootloader 322 of the electronic device 100.

In some configurations, the VPN server can verify that the device attestation private key 906 is valid in order to verify that the trusted bootloader 322 actually generated the device attestation private key 906. At the time of manufacturing the electronic device 100, a device attestation certificate can be provided to the electronic device, the device attestation certificate containing a device attestation public key, and the device attestation certificate can be signed with a globally valid secret key (e.g., the manufacturer's key, an enterprise key, etc.). The VPN server can utilize this certificate with the device attestation public key to verify that the device attestation private key 906 is valid. In this manner, an enterprise, for example, can allow its users to connect to a VPN service and can feel secure in the fact that the electronic devices 100 used by the employee users are running the most up-to-date software (e.g., a most recent OS 320 version), and the electronic device 100 cannot lie about the software that it is running, which could, if undetected, allow an attacker to exploit the VPN service without attestation to discover secrets.

Figure 10:
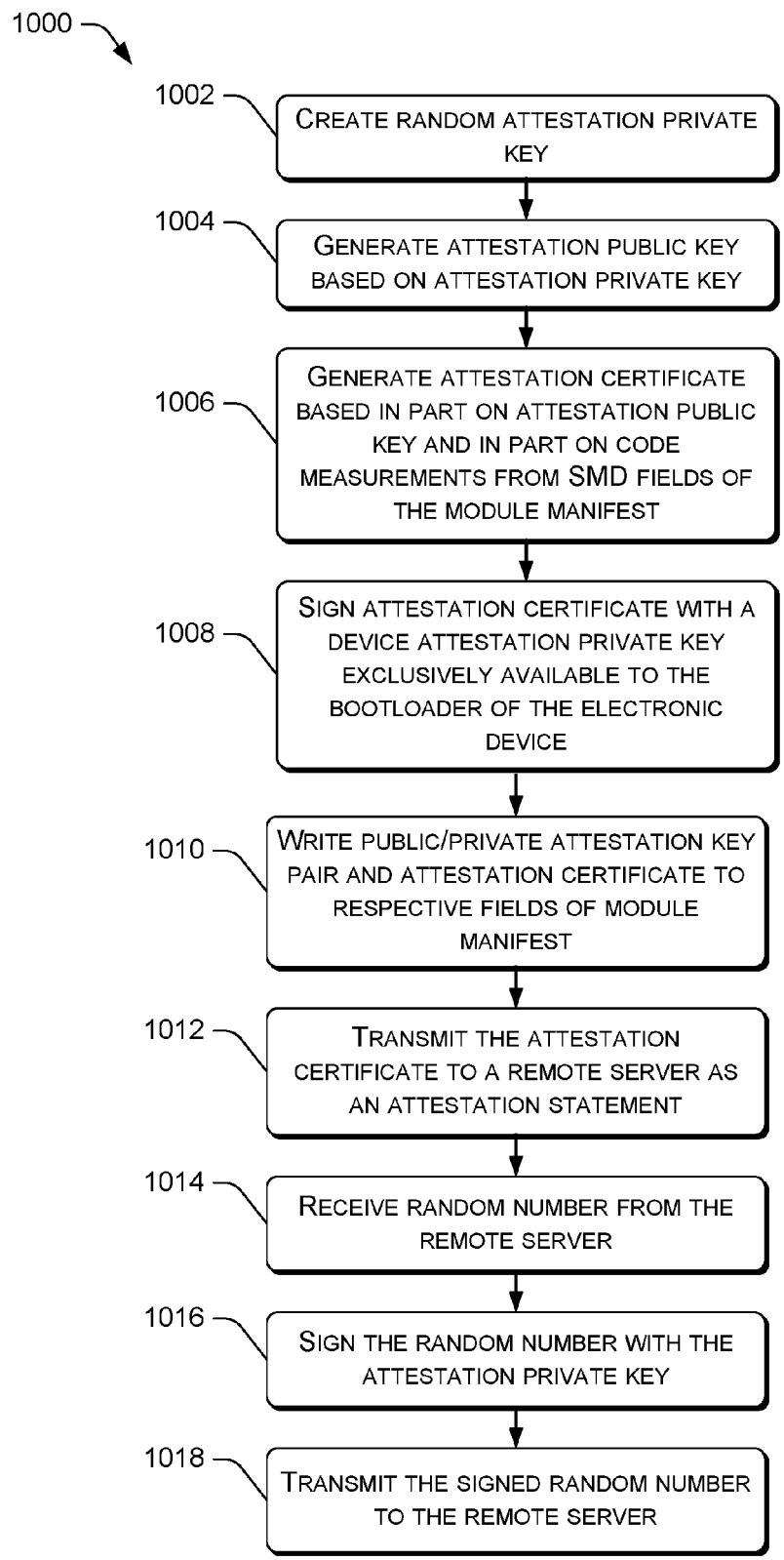
FIG. 10 is a flow diagram of an example attestation process between an electronic device and a remote server.

FIG. 10 is a flow diagram of an example attestation process 1000 between an electronic device 100 and a remote server 314. The process 1000 is described with reference to the previous figures. Particular reference is made to attestation module 326.

At 1002, a random private key can be generated by the RNG 316 of the electronic device 100 called a "manifest attestation private key 902".

At 1004, a manifest attestation public key 900 can be generated based on the manifest attestation private key 902. The generation of the manifest attestation public key 900 at 1004 can utilize an ECC key generation technique.

At 1006, a manifest attestation certificate 904 can be generated based in part on the manifest attestation public key 900 and in part on code measurements from the SMD fields 202 of the module manifest 200 that describe the current software stack on the electronic device 100 that has access to the sealing key 102.

At 1008, the manifest attestation certificate 904 can be signed using a device attestation private key 906 that is exclusively known to the bootloader 322 of the electronic device 100. For example, the device attestation private key 906 can be generated using a cryptographic primitive (e.g., a HMAC algorithm) taking the internal secret 110 as a secret key.

At 1010, the public/private attestation key pair 900 and 902 and the manifest attestation certificate 904 can be written to respective fields of the module manifest 200.

At 1012, during an attestation procedure with a remote server 314 (e.g., a VPN server), the attestation module 326 of the electronic device 100 can transmit the manifest attestation certificate 904 to the remote server 314 as an attestation statement.

At 1014, the electronic device 100 can receive, from the remote server 314, a random number. At 1016, the attestation module 326 can sign the random number received from the remote server 314 using the manifest attestation private key 902. At 1018, the attestation module 326 can transmit the signed random number back to the remote server 314.

The environment and individual elements described herein can of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example One: A method comprising: initiating a first boot session for an electronic device; generating a random seed using a random number generator of the electronic device; generating a sealing key based at least in part on the random seed and a secret that is internal to the electronic device and unique to the electronic device (e.g., a hardware-based key, such as an eFuse secret that is "burned" into a hardware chip at the time of manufacturing the chip); subsequent to generating the sealing key, disabling access to the secret (e.g., setting a register to render the secret unreadable) for a remainder of the first boot session and until a second boot session is initiated; calculating code measurements (e.g., a list of hashes) of multiple boot stages for the first boot session; generating a signature based at least in part on the sealing key and the code measurements; signing at least a portion of a data structure using the signature, the data structure (e.g., a "module manifest") including the code measurements, the random seed, the signature, and the sealing key; and persisting the data structure in the non-volatile memory of the electronic device.

Example Two: The method of Example One, further comprising: completing the first boot session; shutting down or restarting the electronic device; initiating the second boot session; enabling access to the secret; reading the random seed from the data structure; regenerating the sealing key based at least in part on the random seed and the secret; subsequent to regenerating the sealing key, disabling access to the secret for a remainder of the second boot session and until a third boot session is initiated; reading the code measurements from the data structure; and generating an expected signature based at least in part on the sealing key that was regenerated during the second boot session and the code measurements that were read from the data structure during the second boot session.

Example Three: The method of any of the previous examples, alone or in combination, further comprising: determining that the expected signature does not match the signature in the data structure; and based at least on the determination that the expected signature does not match the signature in the data structure, securely erasing the data structure including the sealing key from the non-volatile memory of the electronic device.

Example Four: The method of any of the previous examples, alone or in combination, wherein the code measurements in the data structure include a first hash of a first boot stage of the first boot session and a second hash of a second boot stage of the first boot session, and wherein the second boot session is configured to load a first boot stage of the second boot session and a second boot stage of the second boot session, the method further comprising: determining that the expected signature matches the signature in the data structure; calculating a third hash of the first boot stage of the second boot session; determining that the third hash matches the first hash in the data structure; passing control to the second boot stage of the second boot session; calculating a fourth hash of the second boot stage of the second boot session; determining that the fourth hash does not match the second hash in the data structure; and based at least on the determination that the fourth hash does not match the second hash in the data structure, securely erasing the data structure including the sealing key from the non-volatile memory of the electronic device.

Example Five: The method of any of the previous examples, alone or in combination, wherein the secret comprises an electronic fuse (eFuse) secret.

Example Six: The method of any of the previous examples, alone or in combination, further comprising: downloading a software update to the electronic device; verifying that the software update is safe to install on the electronic device; calculating new code measurements associated with the software update; creating a new data structure that includes the new code measurements; generating a new signature based at least in part on the sealing key and the new code measurements; signing at least a portion of the new data structure using the new signature; and persisting the new data structure in the non-volatile memory of the electronic device.

Example Seven: The method of any of the previous examples, alone or in combination, wherein verifying that the software update is safe to install on the electronic device comprises performing a verification operation, the verification operation comprising at least one of receiving user input at the electronic device or detecting an authorized smart card at the electronic device.

Example Eight: The method of any of the previous examples, alone or in combination, wherein the portion of the data structure that is signed with the signature comprises at least the code measurements and the random seed.

Example Nine: The method of any of the previous examples, alone or in combination, wherein a private portion of the data structure is used to maintain the sealing key and a public portion of the data structure is used to maintain the code measurements, the random seed, and the signature.

Example Ten: The method of any of the previous examples, alone or in combination, wherein generating the sealing key based at least in part on the random seed and the secret is performed using a hash-based message authentication code (HMAC) algorithm wherein the secret corresponds to a key of the HMAC algorithm, the random seed corresponds to data of the HMAC algorithm, and the sealing key corresponds to an output of the HMAC algorithm.

Example Eleven: One or more computer-readable storage media (e.g., RAM, ROM, EEPROM, flash memory, etc.) storing computer-executable instructions that, when executed by a processor (e.g., central processing unit (CPU), a field programmable gate array (FPGA), a complex programmable logic device (CPLD), an application specific integrated circuit (ASIC), a system-on-chip (SoC), etc.), cause the processor to: initiate a first boot session for an electronic device; generate a random seed using a random number generator of the electronic device; generate a sealing key based at least in part on the random seed and a secret that is internal to the electronic device and unique to the electronic device (e.g., a hardware-based key, such as an eFuse secret that is "burned" into a hardware chip at the time of manufacturing the chip); subsequent to generating the sealing key, disable access to the secret (e.g., setting a register to render the secret unreadable) for a remainder of the first boot session and until a second boot session is initiated; calculate code measurements (e.g., a list of hashes) of multiple boot stages for the first boot session; generate a signature based at least in part on the sealing key and the code measurements; sign at least a portion of a data structure using the signature, the data structure (e.g., a "module manifest") including the code measurements, the random seed, the signature, and the sealing key; and persist the data structure in the non-volatile memory of the electronic device.

Example Twelve: The one or more computer-readable storage media of Example Eleven, wherein the computer-executable instructions, when executed by the processor, cause the processor to: complete the first boot session; shut down or restart the electronic device; initiate the second boot session; enable access to the secret; read the random seed from the data structure; regenerate the sealing key based at least in part on the random seed and the secret; subsequent to regenerating the sealing key, disable access to the secret for a remainder of the second boot session and until a third boot session is initiated; read the code measurements from the data structure; and generate an expected signature based at least in part on the sealing key that was regenerated during the second boot session and the code measurements that were read from the data structure during the second boot session.

Example Thirteen: The one or more computer-readable storage media of any of the previous examples, alone or in combination, wherein the computer-executable instructions, when executed by the processor, cause the processor to: determine that the expected signature does not match the signature in the data structure; and based at least on the determination that the expected signature does not match the signature in the data structure, securely erase the data structure including the sealing key from the non-volatile memory of the electronic device.

Example Fourteen: The one or more computer-readable storage media of any of the previous examples, alone or in combination, wherein the code measurements in the data structure include a first hash of a first boot stage of the first boot session and a second hash of a second boot stage of the first boot session, and wherein the second boot session is configured to load a first boot stage of the second boot session and a second boot stage of the second boot session, and wherein the computer-executable instructions, when executed by the processor, cause the processor to: determine that the expected signature matches the signature in the data structure; calculate a third hash of the first boot stage of the second boot session; determine that the third hash matches the first hash in the data structure; pass control to the second boot stage of the second boot session; calculate a fourth hash of the second boot stage of the second boot session; determine that the fourth hash does not match the second hash in the data structure; and based at least on the determination that the fourth hash does not match the second hash in the data structure, securely erase the data structure including the sealing key from the non-volatile memory of the electronic device.

Example Fifteen: The one or more computer-readable storage media of any of the previous examples, alone or in combination, wherein the secret comprises an electronic fuse (eFuse) secret.

Example Sixteen: The one or more computer-readable storage media of any of the previous examples, alone or in combination, wherein the computer-executable instructions, when executed by the processor, cause the processor to: download a software update to the electronic device; verify that the software update is safe to install on the electronic device; calculate new code measurements associated with the software update; create a new data structure that includes the new code measurements; generate a new signature based at least in part on the sealing key and the new code measurements; sign at least a portion of the new data structure using the new signature; and persist the new data structure in the non-volatile memory of the electronic device.

Example Seventeen: The one or more computer-readable storage media of any of the previous examples, alone or in combination, wherein verifying that the software update is safe to install on the electronic device comprises performing a verification operation, the verification operation comprising at least one of receiving user input at the electronic device or detecting an authorized smart card at the electronic device.

Example Eighteen: The one or more computer-readable storage media of any of the previous examples, alone or in combination, wherein the portion of the data structure that is signed with the signature comprises at least the code measurements and the random seed.

Example Nineteen: The one or more computer-readable storage media of any of the previous examples, alone or in combination, wherein a private portion of the data structure is used to maintain the sealing key and a public portion of the data structure is used to maintain the code measurements, the random seed, and the signature.

Example Twenty: The one or more computer-readable storage media of any of the previous examples, alone or in combination, wherein generating the sealing key based at east in part on the random seed and the secret is performed using a hash-based message authentication code (HMAC) algorithm wherein the secret corresponds to a key of the HMAC algorithm, the random seed corresponds to data of the HMAC algorithm, and the sealing key corresponds to an output of the HMAC algorithm.

Example Twenty-One: An electronic device comprising: one or more processors (e.g., central processing units (CPUs), field programmable gate array (FPGAs), complex programmable logic devices (CPLDs), application specific integrated circuits (ASICs), system-on-chips (SoCs), etc.); a random number generator; a hardware-based key (e.g., an eFuse secret that is "burned" into a hardware chip at the time of manufacturing the chip) that is internal, and unique, to the electronic device; and memory (e.g., RAM, ROM, EEPROM, flash memory, etc.) storing computer-executable instructions that, when executed by the one or more processors, cause the one or more processors to: initiate a first boot session for the electronic device; cause the random number generator to generate a random seed; generate a sealing key based at least in part on the random seed and the hardware-based key; subsequent to generating the sealing key, disable access to the hardware-based key (e.g., setting a register to render the hardware-based key unreadable) for a remainder of the first boot session and until a second boot session is initiated; calculate a first hash of a first boot stage of the first boot session and a second hash of a second boot stage of the first boot session; generate a signature based at least in part on the sealing key and the first hash and the second hash; sign at least a portion of a data structure using the signature, the data structure including the first hash, the second hash, the random seed, and the signature; and persist the data structure and the sealing key in the memory of the electronic device.

Example Twenty-Two: The electronic device of Example Twenty-One, wherein the computer-executable instructions, when executed by the one or more processors, cause the one or more processors to: complete the first boot session; shut down or restart the electronic device; initiate the second boot session; enable access to the hardware-based key; read the random seed from the data structure; regenerate the sealing key based at least in part on the random seed and the hardware-based key; subsequent to regenerating the sealing key, disable access to the hardware-based key for a remainder of the second boot session and until a third boot session is initiated; read the first hash and the second hash from the data structure; and generate an expected signature based at least in part on the sealing key that was regenerated during the second boot session and the first hash and the second hash that were read from the data structure during the second boot session.

Example Twenty-Three: The electronic device of any of the previous examples, alone or in combination, wherein the second boot session is configured to load a first boot stage of the second boot session and a second boot stage of the second boot session, and wherein the computer-executable instructions, when executed by the one or more processors, cause the one or more processors to: determine that the expected signature matches the signature in the data structure; calculate a third hash of the first boot stage of the second boot session; determine that the third hash matches the first hash in the data structure; pass control to the second boot stage of the second boot session; calculate a fourth hash of the second boot stage of the second boot session; determine that the fourth hash does not match the second hash in the data structure; and based at least on the determination that the fourth hash does not match the second hash in the data structure, securely erase the sealing key from the memory of the electronic device.

Example Twenty-Four: The electronic device of any of the previous examples, alone or in combination, wherein the computer-executable instructions, when executed by the one or more processors, cause the one or more processors to: download a software update to the electronic device; verify that the software update is safe to install on the electronic device; calculate a new first hash of a new first boot stage and a new second hash of a new second boot stage associated with the software update; create a new data structure that includes the new first hash and the new second hash; generate a new signature based at least in part on the sealing key and the new first hash and the new second hash; sign at least a portion of the new data structure using the new signature; and persist the new data structure in the memory of the electronic device.

Example Twenty-Five: The electronic device of any of the previous examples, alone or in combination, wherein verifying that the software update is safe to install on the electronic device comprises performing a verification operation, the verification operation comprising at least one of receiving a valid pass phrase at the electronic device, receiving a button press at the electronic device or detecting an authorized smart card at the electronic device.

Example Twenty-Six: A method comprising: initiating a first boot session for an electronic device; generating a random seed using a random number generator of the electronic device; generating a sealing key based at least in part on the random seed and a secret that is internal to the electronic device and unique to the electronic device (e.g., a hardware-based key, such as an eFuse secret that is "burned" into a hardware chip at the time of manufacturing the chip); subsequent to generating the sealing key, disabling access to the secret (e.g., setting a register to render the secret unreadable) for a remainder of the first boot session and until a second boot session is initiated; determining code measurements (e.g., a list of hashes) of multiple boot stages for the first boot session; creating a data structure (e.g., a "template module manifest"); writing, to the data structure, the code measurements, the random seed, and the sealing key; generating a signature based at least in part on the sealing key and the code measurements; writing the signature to the data structure; signing at least a portion of a data structure using the signature to obtain a signed data structure (e.g., a "module manifest"); and persisting the signed data structure in the non-volatile memory of the electronic device.

Example Twenty-Seven: One or more computer-readable storage media (e.g., RAM, ROM, EEPROM, flash memory, etc.) storing computer-executable instructions that, when executed by a processor (e.g., central processing unit (CPU), a field programmable gate array (FPGA), a complex programmable logic device (CPLD), an application specific integrated circuit (ASIC), a system-on-chip (SoC), etc.), cause the processor to: initiate a first boot session for an electronic device; generate a random seed using a random number generator of the electronic device, generate a sealing key based at least in part on the random seed and a secret that is internal to the electronic device and unique to the electronic device (e.g., a hardware-based key, such as an eFuse secret that is "burned" into a hardware chip at the time of manufacturing the chip); subsequent to generating the sealing key, disable access to the secret (e.g., setting a register to render the secret unreadable) for a remainder of the first boot session and until a second boot session is initiated; determine code measurements (e.g., a list of hashes) of multiple boot stages for the first boot session; create a data structure (e.g., a "template module manifest"); write, to the data structure, the code measurements, the random seed, and the sealing key; generate a signature based at least in part on the sealing key and the code measurements; write the signature to the data structure; sign at least a portion of a data structure using the signature to obtain a signed data structure (e.g., a "module manifest"); and persist the signed data structure in the non-volatile memory of the electronic device.

Example Twenty-Eight: An electronic device comprising: means for executing computer-executable instructions (e.g., central processing units (CPUs), field programmable gate array (FPGAs), complex programmable logic devices (CPLDs), application specific integrated circuits (ASICs), system-on-chips (SoCs), etc.); means for generating a random number; means for uniquely identifying the electronic device (e.g., an eFuse secret that is "burned" into a hardware chip at the time of manufacturing the chip) that is internal to the electronic device; and means for storing (e.g., RAM, ROM, EEPROM, flash memory, etc.) computer-executable instructions that, when executed by the means for executing computer-executable instructions, cause the means for executing computer-executable instructions to: initiate a first boot session for the electronic device; cause the means for generating the random number to generate a randomseed; generate a sealing key based at least in part on the random seed and the means for uniquely identifying the electronic device; subsequent to generating the sealing key, disable access to the means for uniquely identifying the electronic device (e.g., setting a register to render the hardware-based key unreadable) for a remainder of the first boot session and until a second boot session is initiated; calculate a first hash of a first boot stage of the first boot session and a second hash of a second boot stage of the first boot session; generate a signature based at least in part on the sealing key and the first hash and the second hash; sign at least a portion of a data structure using the signature, the data structure including the first hash, the second hash, the random seed, and the signature; and persist the data structure and the sealing key in the means for storing the computer-executable instructions.

Conclusion

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   initiating a first boot session for an electronic device;
   generating a random seed using a random number generator of the electronic device;
   generating a sealing key based at least in part on the random seed and a secret that is internal to the electronic device and unique to the electron device;
   subsequent to generating the sealing key, disabling access to the secret for a remainder of the first boot session and until a second boot session is initiated;
   calculating code measurements of multiple boot stages for the first boot session;
   generating a signature based at least in part on the sealing key and the code measurements;
   signing at least a portion of a data structure using the signature, the data structure including the code measurements, the random seed, the signature, and the sealing key; and
   persisting the data structure in the non-volatile memory of the electronic device.

2. The method of claim 1, further comprising:
   completing the first boot session;
   shutting down or restarting the electronic device;
   initiating the second boot session;
   enabling access to the secret;
   reading the random seed from the data structure;
   regenerating the sealing key based at least in part on the random seed and the secret;
   subsequent to regenerating the sealing key, disabling access to the secret for a remainder of the second boot session and until a third boot session is initiated;
   reading the code measurements from the data structure; and
   generating an expected signature based at least in part on the sealing key that was regenerated during the second boot session and the code measurements that were read from the data structure during the second boot session.

3. The method of claim 2, further comprising:
   determining that the expected signature does not match the signature in the data structure; and
   based at least on the determination that the expected signature does not match the signature in the data structure, securely erasing the data structure including the sealing key from the non-volatile memory of the electronic device.

4. The method of claim 2, wherein the code measurements in the data structure include a first hash of a first boot stage of the first boot session and a second hash of a second boot stage of the first boot session, and wherein the second boot session is configured to load a first boot stage of the second boot session and a second boot stage of the second boot session, the method further comprising:
   determining that the expected signature matches the signature in the data structure;
   calculating a third hash of the first boot stage of the second boot session;
   determining that the third hash matches the first hash in the data structure;
   passing control to the second boot stage of the second boot session;
   calculating a fourth hash of the second boot stage of the second boot session;
   determining that the fourth hash does not match the second hash in the data structure; and
   based at least on the determination that the fourth hash does not match the second hash in the data structure, securely erasing the data structure including the sealing key from the non-volatile memory of the electronic device.

5. The method of claim 1, wherein the secret comprises an electronic fuse (eFuse) secret.

6. The method of claim 1, further comprising:
   downloading a software update to the electronic device;
   verifying that the software update is safe to install on the electronic device;
   calculating new code measurements associated with the software update;
   creating a new data structure that includes the new code measurements;
   generating a new signature based at least in part on the sealing key and the new code measurements;
   signing at least a portion of the new data structure using the new signature; and
   persisting the new data structure in the non-volatile memory of the electronic device.

7. The method of claim 6, wherein verifying that the software update is safe to install on the electronic device comprises performing a verification operation, the verification operation comprising at least one of receiving user input at the electronic device or detecting an authorized smart card at the electronic device.

8. The method of claim 1, wherein the portion of the data structure that is signed with the signature comprises at least the code measurements and the random seed.

9. The method of claim 1, wherein a private portion of the data structure is used to maintain the sealing key and a public portion of the data structure is used to maintain the code measurements, the random seed, and the signature.

10. An electronic device comprising:
one or more processors;
a random number generator;
a hardware-based key that is internal, and unique, to the electronic device; and
memory storing computer-executable instructions that, when executed by the one or more processors, cause the one or more processors to:
 initiate a first boot session for the electronic device;
 cause the random number generator to generate a random seed;
 generate a sealing key based at least in part on the random seed and the hardware-based key;
 subsequent to generating the sealing key, disable access to the hardware-based key for a remainder of the first boot session and until a second boot session is initiated;
 calculate a first hash of a first boot stage of the first boot session and a second hash of a second boot stage of the first boot session;
 generate a signature based at least in part on the sealing key and the first hash and the second hash;
 sign at least a portion of a data structure using the signature, the data structure including the first hash, the second hash, the random seed, and the signature; and
 persist the data structure and the sealing key in the memory of the electronic device.

11. The electronic device of claim 10, wherein the computer-executable instructions, when executed by the one or more processors, cause the one or more processors to:
complete the first boot session;
shut down or restart the electronic device;
initiate the second boot session;
enable access to the hardware-based key;
read the random seed from the data structure;
regenerate the sealing key based at least in part on the random seed and the hardware-based key;
subsequent to regenerating the sealing key, disable access to the hardware-based key for a remainder of the second boot session and until a third boot session is initiated;
read the first hash and the second hash from the data structure; and
generate an expected signature based at least in part on the sealing key that was regenerated during the second boot session and the first hash and the second hash that were read from the data structure during the second boot session.

12. The electronic device of claim 11, wherein the second boot session is configured to load a first boot stage of the second boot session and a second boot stage of the second boot session, and wherein the computer-executable instructions, when executed by the one or more processors, cause the one or more processors to:

determine that the expected signature matches the signature in the data structure;
calculate a third hash of the first boot stage of the second boot session;
determine that the third hash matches the first hash in the data structure;
pass control to the second boot stage of the second boot session;
calculate a fourth hash of the second boot stage of the second boot session;
determine that the fourth hash does not match the second hash in the data structure; and
based at least on the determination that the fourth hash does not match the second hash in the data structure, securely erase the sealing key from the memory of the electronic device.

13. The electronic device of claim 10, wherein the computer-executable instructions, when executed by the one or more processors, cause the one or more processors to:
download a software update to the electronic device;
verify that the software update is safe to install on the electronic device;
calculate a new first hash of a new first boot stage and a new second hash of a new second boot stage associated with the software update;
create a new data structure that includes the new first hash and the new second hash;
generate a new signature based at least in part on the sealing key and the new first hash and the new second hash;
sign at least a portion of the new data structure using the new signature; and
persist the new data structure in the memory of the electronic device.

14. The electronic device of claim 13, wherein verifying that the software update is safe to install on the electronic device comprises performing a verification operation, the verification operation comprising at least one of receiving a valid pass phrase at the electronic device, receiving a button press at the electronic device or detecting an authorized smart card at the electronic device.

15. A method comprising:
initiating a first boot session for n electronic device;
generating a random seed using a random number generator of the electronic device;
generating a sealing key based at least in part on the random seed and a secret that is internal to the electronic device and unique to the electronic device;
subsequent to generating the sealing key, disabling access to the secret for a remainder of the first boot session and until a second boot session is initiated;
determining code measurements of multiple boot stages for the first boot session;
creating a data structure;
writing, to the data structure, the code measurements, the random seed, and the sealing key;
generating a signature based at least in part on the sealing key and the code measurements;
writing the signature to the data structure;
signing at least a portion of a data structure using the signature to obtain a signed data structure; and
persisting the signed data structure in the non-volatile memory of the electronic device.

16. The method of claim 15, wherein the secret comprises an electronic fuse (eFuse) secret.

17. The method of claim 15, wherein generating the sealing key based at least in part on the random seed and the secret is performed using a hash-based message authentication code (HMAC) algorithm wherein the secret corresponds to a key of the HMAC algorithm, the random seed corresponds to data of the HMAC algorithm, and the sealing key corresponds to an output of the HMAC algorithm.

18. The method of claim 15, further comprising:
completing the first boot session;
shutting down or restarting the electronic device;
initiating the second boot session;
enabling access to the secret;
reading the random seed from the data structure;
regenerating the sealing key based at least in part on the random seed and the secret;
subsequent to regenerating the sealing key, disabling access to the secret for a remainder of the second boot session and until a third boot session is initiated;
reading the code measurements from the data structure; and
generating an expected signature based at least in part on the sealing key that was regenerated during the second boot session and the code measurements that were read from the data structure during the second boot session.

19. The method of claim 18, wherein the code measurements in the data structure include a first hash of a first boot stage of the first boot session and a second hash of a second boot stage of the first boot session, and wherein the second boot session is configured to load a first boot stage of the second boot session and a second boot stage of the second boot session, the method further comprising:
determining that the expected signature matches the signature in the data structure;
calculating a third hash of the first boot stage of the second boot session;
determining that the third hash matches the first hash in the data structure;
passing control to the second boot stage of the second boot session;
calculating a fourth hash of the second boot stage of the second boot session;
determining that the fourth hash does not match the second hash in the data structure; and
based at least on the determination that the fourth hash does not match the second hash in the data structure, securely erasing the data structure including the sealing key from the non-volatile memory of the electronic device.

20. The method of claim 15, further comprising:
downloading a software update to the electronic device;
verifying that the software update is safe to install on the electronic device;
calculating new code measurements associated with the software update;
creating a new data structure that includes the new code measurements;
generating a new signature based at least in part on the sealing key and the new code measurements;
signing at least a portion of the new data structure using the new signature; and
persisting the new data structure in the non-volatile memory of the electronic device.

* * * * *